US012682270B2

(12) United States Patent
Lee et al.

(10) Patent No.: US 12,682,270 B2
(45) Date of Patent: Jul. 14, 2026

(54) QUANTUM INFORMATION PROCESSING SYSTEM AND QUANTUM INFORMATION PROCESSING METHOD OF QUANTUM INFORMATION PROCESSING SYSTEM

(71) Applicant: Hitachi, Ltd., Tokyo (JP)

(72) Inventors: Noriyuki Lee, Tokyo (JP); Digh Hisamoto, Tokyo (JP); Ryuta Tsuchiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 748 days.

(21) Appl. No.: 18/115,092

(22) Filed: Feb. 28, 2023

(65) Prior Publication Data

US 2024/0095566 A1      Mar. 21, 2024

(30) Foreign Application Priority Data

Sep. 20, 2022      (JP) .................................. 2022-149209

(51) Int. Cl.
*G06N 10/40*           (2022.01)
*G06N 10/20*           (2022.01)
(52) U.S. Cl.
CPC ............. *G06N 10/40* (2022.01); *G06N 10/20* (2022.01)
(58) Field of Classification Search
CPC ........ G06N 10/00; G06N 10/20; G06N 10/40; G06N 10/60; G06N 10/70; G06N 10/80; G06F 10/10
USPC ........................................................ 716/100
See application file for complete search history.

(56) References Cited

U.S. PATENT DOCUMENTS

| | | |
|---|---|---|
| 2022/0292383 A1 | 9/2022 | Lee et al. |
| 2023/0267360 A1* | 8/2023 | Dzurak ................. G06N 10/40 |
| | | 716/100 |

FOREIGN PATENT DOCUMENTS

| | | |
|---|---|---|
| JP | 2021-27142 A | 2/2021 |
| WO | 2022/032331 A1 | 2/2022 |

OTHER PUBLICATIONS

Japanese Office Action received in corresponding Japanese Application No. 2022-149209 dated Jan. 6, 2026.

* cited by examiner

*Primary Examiner* — Paul Dinh
(74) *Attorney, Agent, or Firm* — MATTINGLY & MALUR, PC

(57)           ABSTRACT
A quantum bit array including a plurality of quantum dots capable of confining a quantum bit and a plurality of gate electrodes used to control of the plurality of quantum dots, and a control device controlling a plurality of quantum bits using the plurality of gate electrodes, the quantum bit array includes a storage region including a plurality of quantum dots storing the quantum bit, and an operation region including a plurality of quantum dots capable of applying a quantum gate operation of changing a spin state to the confined quantum bit, the stored quantum bit is moved from the storage region to the operation region by a shuttle operation of moving the quantum bit with a Coulomb force generated by using the plurality of gate electrodes, and the quantum gate operation of changing the spin state to the quantum bit is performed in the operation region.

8 Claims, 15 Drawing Sheets

Fig. 1
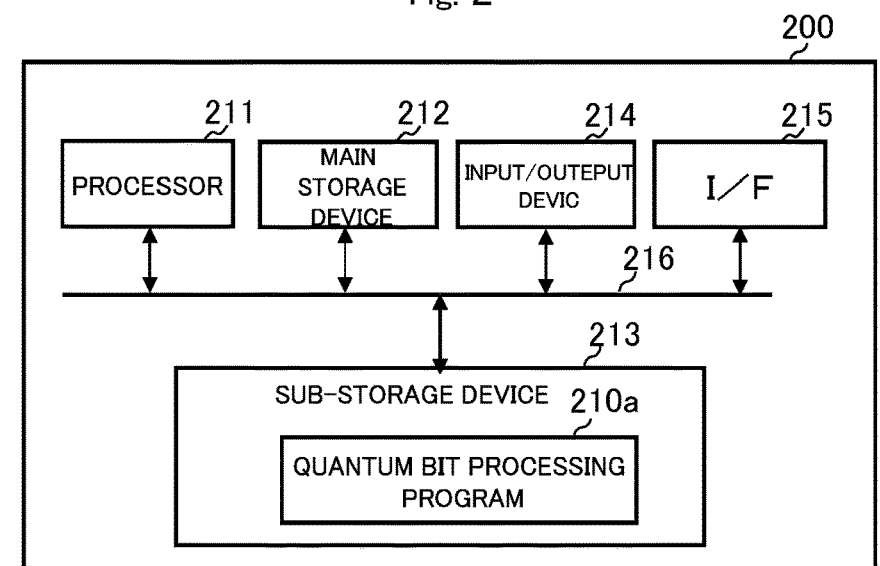
Fig. 2
Fig. 3
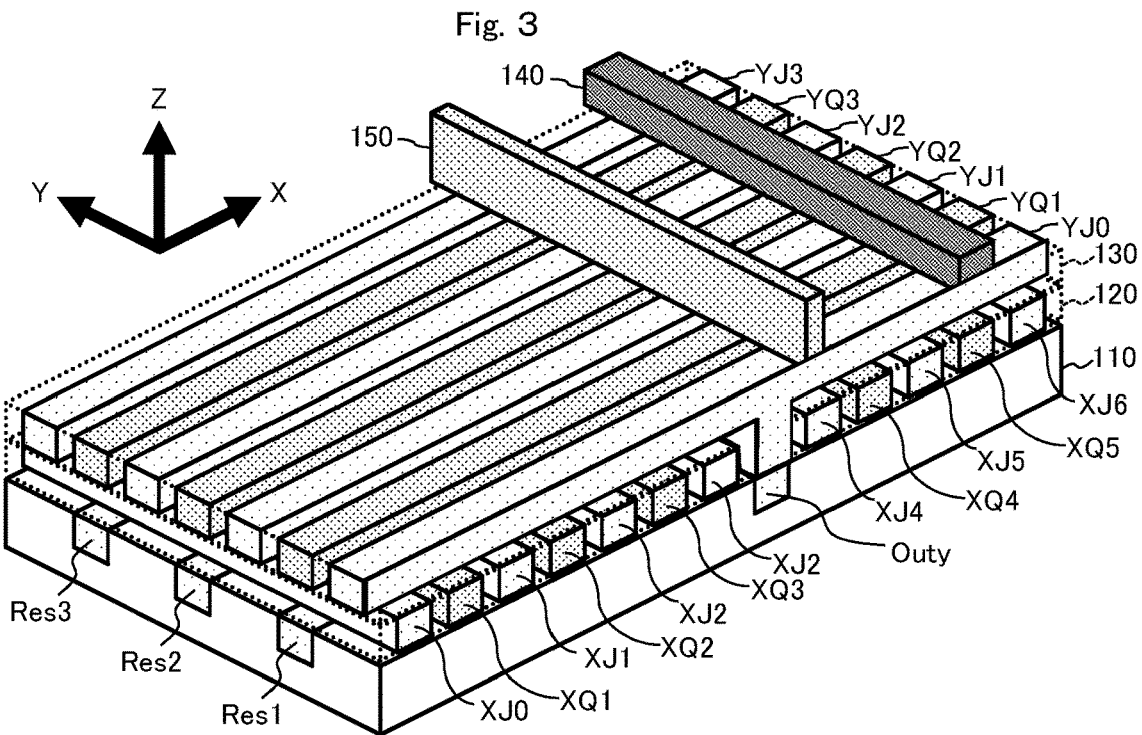

| STORAGE REGION A1 | | OPERATION REGION A2 | | STORAGE REGION A1 |
|---|---|---|---|---|
| | MOVEMENT REGION A3 | | MOVEMENT REGION A3 | |
| OPERATION REGION A2 | | STORAGE REGION A1 | | OPERATION REGION A2 |
| | MOVEMENT REGION A3 | | MOVEMENT REGION A3 | |
| STORAGE REGION A1 | | OPERATION REGION A2 | | STORAGE REGION A1 |
| | MOVEMENT REGION A3 | | MOVEMENT REGION A3 | |
| OPERATION REGION A2 | | STORAGE REGION A1 | | OPERATION REGION A2 |

Figures 10, 11:
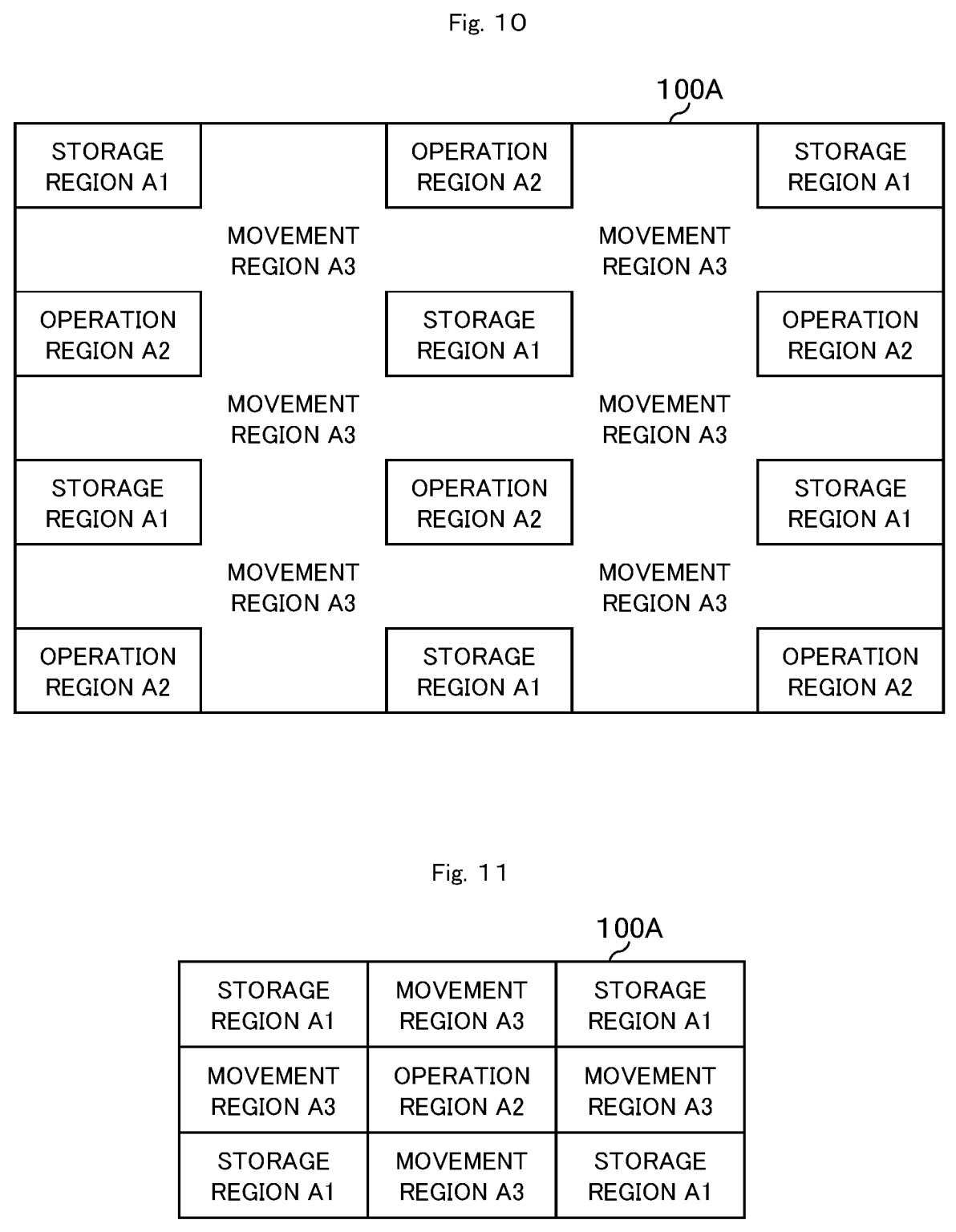

| STORAGE REGION A1 | MOVEMENT REGION A3 | STORAGE REGION A1 |
|---|---|---|
| MOVEMENT REGION A3 | OPERATION REGION A2 | MOVEMENT REGION A3 |
| STORAGE REGION A1 | MOVEMENT REGION A3 | STORAGE REGION A1 |

| STORAGE REGION A1 |
| MOVEMENT REGION A3 |
| OPERATION REGION A2 |
| MOVEMENT REGION A3 |
| STORAGE REGION A1 |

| STORAGE REGION A1 |
| OPERATION REGION A2 |
| STORAGE REGION A1 |

Figures 12, 13, 14:
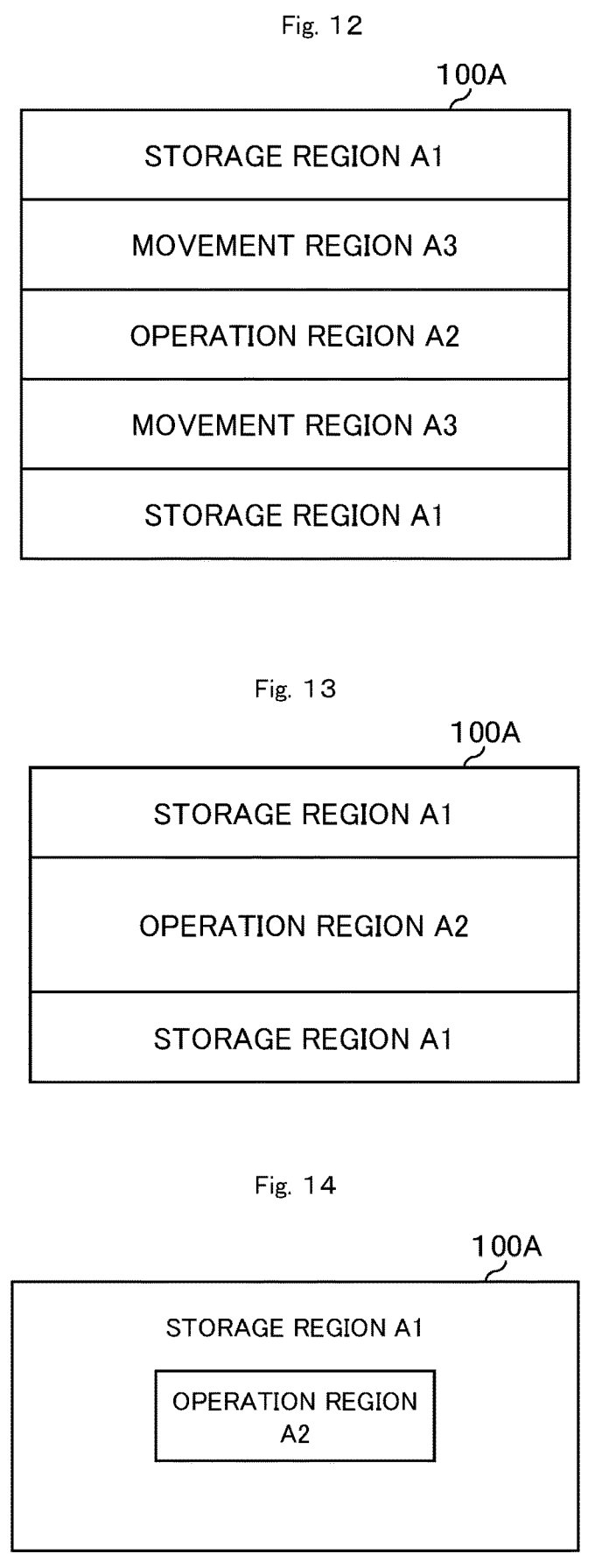

STORAGE REGION A1

| OPERATION REGION A2 |

QUANTUM INFORMATION PROCESSING SYSTEM AND QUANTUM INFORMATION PROCESSING METHOD OF QUANTUM INFORMATION PROCESSING SYSTEM

CROSS-REFERENCE TO RELATED APPLICATION

The present application claims priority from Japanese application JP2022-149209, filed on Sep. 20, 2022, the contents of which is hereby incorporated by reference into this application.

BACKGROUND OF THE INVENTION

1. Field of the Invention

The present invention relates to a quantum information processing system performing quantum gate operations of changing the spin state of a plurality of quantum bits and a quantum information processing method of the quantum information processing system.

2. Description of the Related Art

In a quantum computer, it is absolutely essential to generate and operate a plurality of quantum bits in order to perform a large-scale calculation. Therefore, there are technologies of generating and operating a plurality of quantum bits in the quantum computer. In JP 2021-27142 A, a quantum information processing device including a semiconductor fin by using an electron as a quantum bit is described. Here, the quantum information processing device is capable of arranging and moving the plurality of quantum bits in the fin into the shape of a two-dimensional square lattice. Further, the quantum information processing device is capable of performing a quantum gate operation of changing a spin state of the quantum bit in the fin.

SUMMARY OF THE INVENTION

However, in general, in the quantum computer where the electron is generated and operated as the quantum bit, an operation target quantum bit is operated by applying a static magnetic field or an electromagnetic pulse. Due to the static magnetic field or the electromagnetic pulse applied to operate the operation target quantum bit, disorder in the spin state such as an amplitude change or a phase rotation may occur in a quantum bit around the operation target quantum bit. As a result thereof, it is difficult to perform the calculation using the quantum.

An object of the invention is to provide a quantum information processing system capable of performing a quantum calculation while suppressing disorder in a spin state of a quantum bit, and a quantum information processing method of the quantum information processing system.

In order to attain the object described above, one aspect of a quantum information processing system of the invention is a quantum information processing system performing a quantum gate operation of changing a spin state to a plurality of quantum bits, in which when distance between a target quantum bit of the quantum gate operation and a quantum bit around the target quantum bit of the quantum gate operation is larger than a predetermined length capable of suppressing the disturbance of spin state of the quantum bits due to quantum gate operation on quantum bits when quantum gate operation is applied to quantum bits, the control device applies the quantum gate operation to the target quantum bit of the quantum gate operation.

In addition, one aspect of the quantum information processing system of the invention is a quantum information processing system performing a quantum gate operation of changing a spin state to a plurality of quantum bits, the system including: a quantum bit array including a plurality of quantum dots capable of confining the quantum bit and a plurality of gate electrodes used in control of the plurality of quantum dots; and a control device controlling the plurality of quantum bits confined in the quantum bit array by using the plurality of gate electrodes, in which the quantum bit array includes: a storage region including a plurality of quantum dots storing the quantum bit; and an operation region including a plurality of quantum dots capable of applying the quantum gate operation of changing the spin state to the confined quantum bit, and the control device moves the quantum bit stored in the storage region from the storage region to the operation region by a shuttle operation of moving the quantum bit with a Coulomb force generated by using the plurality of gate electrodes, and further performs the quantum gate operation of changing the spin state to the quantum bit in the operation region.

In addition, one aspect of a quantum information processing method of a quantum information processing system of the invention is a quantum information processing method of a quantum information processing system performing a quantum gate operation of changing a spin state to a plurality of quantum bits, in which the quantum information processing system includes: a quantum bit array including a plurality of quantum dots capable of containing the quantum bit and a plurality of gate electrodes used in control of the plurality of quantum dots; and a control device controlling the plurality of quantum bits confined in the quantum bit array by using the plurality of gate electrodes, the quantum bit array includes: a storage region including a plurality of quantum dots storing the quantum bit; and an operation region including a plurality of quantum dots capable of applying the quantum gate operation of changing the spin state to the confined quantum bit, and the method allows the control device moves the quantum bit stored in the storage region from the storage region to the operation region by a shuttle operation of moving the quantum bit with a Coulomb force generated by using the plurality of gate electrodes, and further performs the quantum gate operation of changing the spin state to the quantum bit in the operation region.

According to the invention, it is possible to perform the quantum calculation while suppressing the disorder in the spin state of the quantum bit.

Objects, configurations, and effects other than those described above will be obvious by the following description of modes for carrying out the invention.

BRIEF DESCRIPTION OF THE DRAWINGS

FIG. 1 is a diagram illustrating an example of a function block diagram of a quantum information processing system of an embodiment;

FIG. 2 is a block diagram illustrating a hardware configuration example of a control device of the embodiment;

FIG. 3 is a schematic perspective view of a quantum calculation device of the embodiment;

FIG. 10 is a diagram illustrating an example of an arrangement of a storage region, an operation region, and a movement region in a quantum bit array of a quantum information processing system of a third modification example;

FIG. 11 is a diagram illustrating an example of an arrangement of a storage region, an operation region, and a movement region in a quantum bit array of a quantum information processing system of a fourth modification example;

FIG. 12 is a diagram illustrating an example of an arrangement of a storage region, an operation region, and a movement region in a quantum bit array of a quantum information processing system of a fifth modification example;

FIG. 13 is a diagram illustrating an example of an arrangement of a storage region, an operation region, and a movement region in a quantum bit array of a quantum information processing system of a sixth modification example; and FIG. 14 is a diagram illustrating an example of an arrangement of a storage region, an operation region, and a movement region in a quantum bit array of a quantum information processing system of a seventh modification example.

DETAILED DESCRIPTION OF THE PREFERRED EMBODIMENTS

Figure 4:
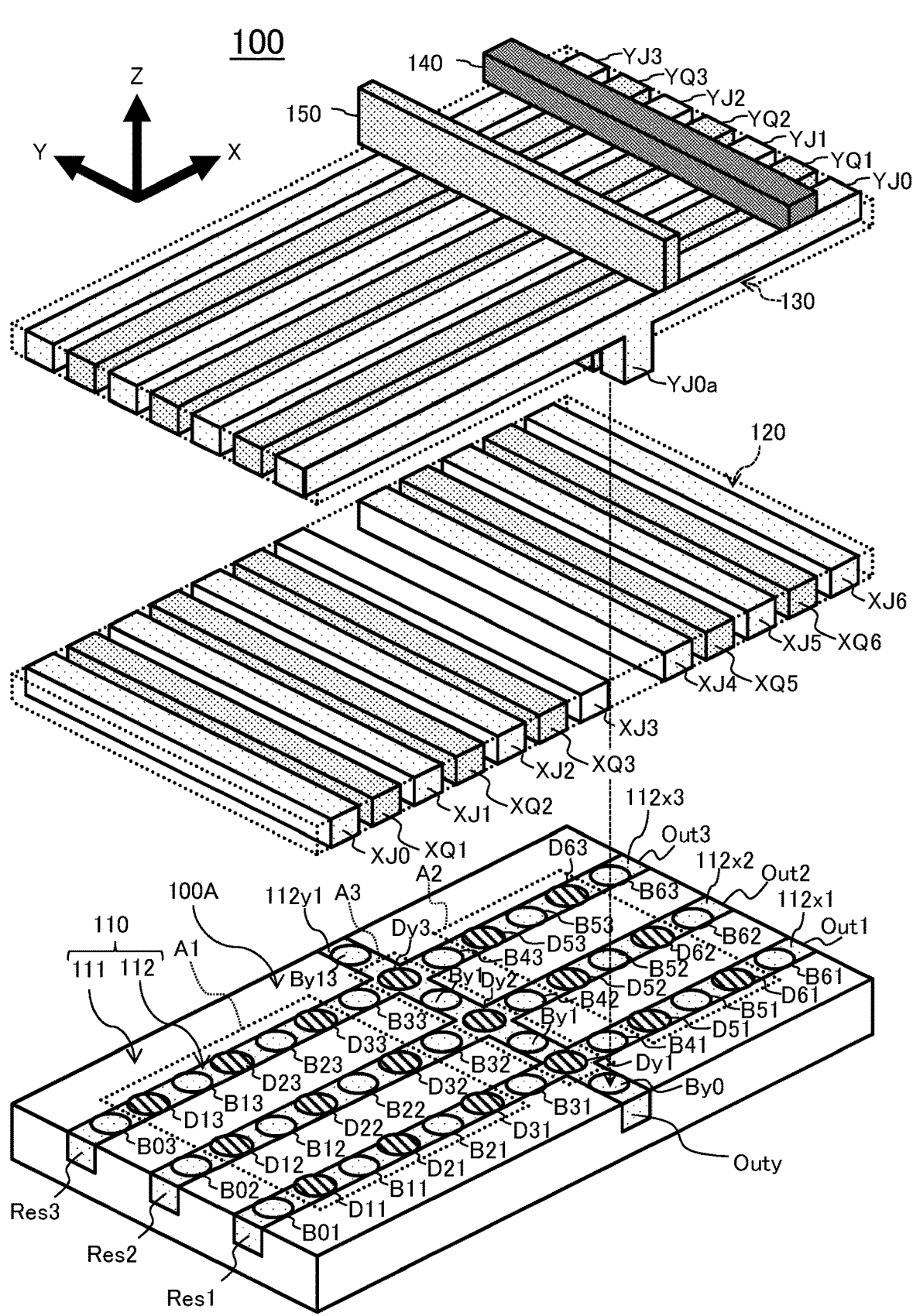
FIG. 4 is a schematic exploded perspective view of the quantum calculation device of the embodiment.

Hereinafter, modes for carrying out the invention will be described with reference to the drawings. In the drawings, in a case where an X axis, a Y axis, and a Z axis are described, the axes are orthogonal to each other.

Embodiments and modification examples are an example for describing the invention, and are suitably omitted and simplified in order to clarify the description. The invention can be implemented in various other modes. Unless otherwise specified, each constituent may be singular or plural. In addition, the position, the size, the shape, or the range of each constituent illustrated in the drawings may not represent the actual position, size, shape, or range, in order to facilitate understanding of the invention. Accordingly, the invention is not necessarily limited to the position, the size, the shape, or the range illustrated in the drawings. In a case where there are a plurality of constituents having the same or similar function, the constituents may be described by applying different suffixes to the same reference numeral. In addition, in a case where it is not necessary to distinguish such a plurality of constituents, the suffix may be omitted.

A quantum information processing system 1 of an embodiment is a type of quantum computer. The quantum information processing system 1 performs quantum gate operations of changing the spin state of a plurality of quantum bits. Note that, the quantum bit may be a charged particle, or may be an ion instead of an electron.

<<Configuration of Quantum Information Processing System 1 (FIG. 1 to FIG. 6)>>

FIG. 1 is a diagram illustrating an example of a function block diagram of the quantum information processing system 1 of the embodiment. As illustrated in FIG. 1, the quantum information processing system 1 includes a quantum calculation device 100 operating electrons those are quantum bits, a control device 200 controlling the quantum calculation device 100, and a measurement device 300 measuring the state of the electrons. The details of the quantum calculation device 100 will be described below. The control device 200 includes a quantum bit processing unit 210 controlling the quantum calculation device 100. The measurement device 300 is connected to the quantum calculation device 100 and the control device 200. The measurement device 300 measures the state of the electrons (the quantum bits) relevant to the electrons output from the quantum calculation device 100, such as the number of electrons (quantum bits), and outputs measurement results to the control device 200. The state of the electrons (the quantum bits) measured by the measurement device 300 is a calculation result of a quantum calculation.

FIG. 2 is a diagram illustrating an example of a hardware configuration of the control device 200. As illustrated in FIG. 2, the control device 200 includes a processor 211, a main storage device 212, a sub-storage device 213, an input/output device 214, a quantum calculation device I/F 215 connected to the quantum calculation device 100, a bus 216 connecting the devices described above, and the like, as the hardware configuration. The control device 200, for example, may be a dedicated circuit performing specific processing, such as a field programmable gate array (FPGA), an application specific integrated circuit (ASIC), or a complex programmable logic device (CPLD).

The processor 211 reads out data or a program stored in the sub-storage device 213 to the main storage device 212, and executes processing set by the program. The main storage device 212 is a device that includes a volatile storage element such as a RAM, and stores a program, data, or the like. The sub-storage device 213 is a device such as a hard disk drive (HDD) or a solid state drive (SSD) that includes a non-volatile storage element, and stores a program, data, or the like. In the sub-storage device 213, a quantum bit processing program 210a is stored. The processor 211 realizes the qubit processing unit 210 by reading out the quantum bit processing program 210a stored in the sub-storage device 213 to the main storage device 220 and executes the quantum bit processing program 210a. In this specification, the case of describing processing in a sentence with the quantum bit processing unit 210 as a subject, indicates that the processor 211 of the control device 200 executes the quantum bit processing program 210a for realizing the quantum bit processing unit 210.

The input/output device 240 includes a device such as a keyboard or a mouse that receives the operation of a user and a device such as a display that outputs information, and is capable of receiving the operation from the user and of presenting the information to the user.

The user inputs the contents of the calculation using the quantum bit to the control device 200 by using the input/output device 240. The processor 211 of the control device 200 executes the processing of the quantum bit processing program 210a with the contents of the calculation using the quantum bit that are input by the user as input. In the processing of the quantum bit processing program 210a, the calculation using the quantum bit is performed by using the quantum calculation device 100.

FIG. 3 is a schematic perspective view of the quantum calculation device 100. FIG. 4 is a schematic exploded perspective view of quantum information processing.

As illustrated in FIG. 3, the quantum calculation device 100 includes a calculation layer 110, a first gate electrode layer 120, a second gate electrode layer 130, a magnet 140, and a magnetic shield 150. As described below, in the quantum calculation device 100, the calculation layer 110, the first gate electrode layer 120, and the second gate electrode layer 130 form a quantum bit array 100A.

As illustrated in FIG. 4, the calculation layer 110 includes a calculation layer main body 111, and a calculation region 112 formed inside the calculation layer main body 111. The calculation layer main body 111 includes a P-type semiconductor (for example, P-type Si). The calculation layer main body 111 is connected to the control device 200. The control device 200 is capable of changing the potential of the calculation layer main body 111.

The calculation region 112 includes an intrinsic semiconductor (for example, intrinsic Si). The control device 200 is capable of performing the operation of the quantum calculation such as the confinement of the electron that is the quantum bit in the calculation region 112 or the movement of the electron confined in the calculation region 112. In addition, the calculation region 112 includes X portions 112x1, 112x2, and 112x3 that are each provided at an interval and extend in an X axis direction, and a Y portion 112y1 that connects the X portions 112x1, 112x2, and 112x3 and extends in a Y axis direction. The control device 200 is capable of performing the input and output of the electron that is a quantum dot from terminals Res1 and Out1 of the X portion 112x1, terminals Res2 and Out2 of the X portion 112x2, terminals Res3 and Out3 of the X portion 112x3, or terminals Resy and Outy of the Y portion 112y1. Accordingly, the control device 200 is capable of performing the input and output of the electron from the outside of the quantum bit array 100A to the calculation region 112.

Each of the terminal Out1 of the X portion 112x1, the terminal Out2 of the X portion 112x2, and the terminal Out3 of the X portion 112x3 in the calculation region 112 is connected to the measurement device 300 (not illustrated in FIG. 3 and FIG. 4).

The measurement device 300 measures the state of the electron (the quantum bit) such as the number of electrons (quantum bits), relevant to the electron output from each of the terminal Out1 of the X portion 112x1, the terminal Out2 of the X portion 112x2, and the terminal Out3 of the X portion 112x3 in the calculation region 112, and outputs the measurement result to the control device 200. The state of the electron (the quantum bit) measured by the measurement device 300 is the calculation result of the quantum calculation.

The first gate electrode layer 120 is connected to the control device 200, and includes gate electrodes XJ0 to XJ6 and XQ1 to XQ6 extending in the Y axis direction. A "gate electrode XJ" is a collective term of the gate electrodes XJ0 to XJ6. In addition, a "gate electrode XQ" is a collective term of the gate electrodes XQ1 to XQ6. The gate electrode XQ and the gate electrode XJ are alternately arranged along the X axis direction. In addition, each of the gate electrodes XJ0 to XJ6 and XQ1 to XQ6 is insulated from the adjacent gate electrode XJ and gate electrode XQ. The control device 200 is capable of applying voltages with different potentials to the gate electrodes XJ0 to XJ6 and XQ1 to XQ6, respectively.

The second gate electrode layer 130 is connected to the control device 200, and includes gate electrodes YJ0 to YJ3 and YQ1 to YQ3 extending in the Y axis direction. A "gate electrode YJ" is a collective term of the gate electrodes YJ1 to YJ3. In addition, a "gate electrode YQ" is a collective term of the gate electrodes YQ1 to YQ3. As illustrated in FIG. 4, the gate electrode YJ0 includes a protrusion YJ0a protruding in a Z axis direction (a −Z direction). As illustrated in FIG. 3, the protrusion YJ0a penetrates through the first gate electrode layer 120, and is close to the Y portion 112Y1 in the calculation region 112 of the calculation layer 110. Each of the gate electrodes YJ1 to YJ3 and YQ1 to YQ3 includes the same protrusion as the protrusion YJ0a of the gate electrode YJ0, and a collective term of the protrusions is a "protrusion Ya".

The gate electrode YQ and the gate electrode YJ are alternately arranged along the Y axis direction. In addition, each of the gate electrodes YJ0 to YJ3 and YQ1 to YQ3 is insulated from the adjacent gate electrode YJ and gate electrode YQ. The control device 200 is capable of applying voltages with different potentials to the gate electrodes YJ0 to YJ3 and YQ1 to YQ3, respectively. In addition, the control device 200 applies voltages with different potentials to the gate electrodes YJ0 to YJ3 and YQ1 to YQ3, respectively, such that the voltage can be applied to each of quantum dots DY1 to DY3 and BY0 to BY3 described below of the Y portion 112$y$1 of the calculation layer 110 from the protrusion Ya of each of the gate electrodes YJ0 to YJ3 and YQ1 to YQ3.

The magnet 140 exerts a magnetic force to the calculation region 112 of the calculation layer 110.

The magnetic shield 150 shields the magnetic force of the magnet 140.

The calculation region 112 in the calculation layer 110, the first gate electrode layer 120, and the second gate electrode layer 130 form a plurality of N channel field-effect transistors (FET). That is, the N channel field-effect transistor (FET) is formed at a position in which each of the X portions 112$x$1, 112$x$2, and 112$x$3 in the calculation region 112 of the calculation layer 110, each of the gate electrodes XJ0 to XJ6 and the gate electrodes XQ1 to XQ6 of the first gate electrode layer 120, and each of the gate electrodes YJ0 to YJ3 and the gate electrodes YQ1 to YQ6 of the second gate electrode layer 130 overlap with each other. In addition, the N channel field-effect transistor (FET) is also formed at a position in which the Y portion 112$y$1 in the calculation region 112 of the calculation layer 110 and the protrusion Ya of each of the gate electrodes YJ0 to YJ2 and YQ1 to YQ3 overlap with each other. The control device 200 is capable of using such N channel field-effect transistors (FET) as a quantum dot in which the electron that is the quantum bit is confined or a potential barrier between the quantum dots.

A position in which each of the X portions 112$x$1, 112$x$2, and 112$x$3 in the calculation region 112 of the calculation layer 110, each of the gate electrodes XQ1 to XQ6 of the first gate electrode layer 120, and each of the gate electrodes YQ1 to YQ6 of the second gate electrode layer 130 overlap with each other is used as the quantum dot. A quantum dot at a position in which the gate electrode XQi and the gate electrode YQj overlap with each other is represented as a quantum dot "Dij". Then, in an initial state described below, an electron confined in the quantum dot Dij is represented as "eij".

On the other hand, a position in which each of the X portions 112$x$1, 112$x$2, and 112$x$3 in the calculation region 112 of the calculation layer 110, each of the gate electrodes XJ0 to XJ6 of the first gate electrode layer 120, and each of the gate electrodes YQ1 to YQ6 of the second gate electrode layer 130 overlap with each other is used as the potential barrier. Then, a field-effect transistor of a potential barrier at a position in which the gate electrode XJi and the gate electrode YQj overlap with each other is represented as a "potential barrier Bij".

A position in which the Y portion 112$y$1 of the first gate electrode layer 120 and the protrusion Ya of each of the gate electrodes YQ1 to YQ3 overlap with each other is also used as the quantum dot. A quantum dot at a position in which the Y portion 112$y$1 of the first gate electrode layer 120 and the protrusion Ya of the gate electrode YQi overlap with each other is represented as a "quantum dot Dyi". Then, in the initial state described below, an electron confined in the quantum dot Dyi is represented as an "electron eyi".

A position in which the Y portion 112$y$1 of the first gate electrode layer 120 and the protrusion Ya of each of the gate electrodes YJ0 to YJ3 overlap with each other is also used as the potential barrier. Then, a field-effect transistor of a potential barrier at a position in which the Y portion 112$y$1 of the first gate electrode layer 120 and the protrusion Ya of the gate electrode YJi overlap with each other is represented as a "potential barrier BYi".

In addition, the control device 200 is capable of changing the potential by applying a voltage, of applying a DC current, or of generating a pulse by applying an AC current, to the gate electrodes XQ, XJ, YQ, and YJ. Accordingly, even though the details will be described below, the control device 200 is capable of confining the electron that is the quantum bit in the quantum dot, or of moving the electron between the quantum dots. In addition, the control device 200 is capable of performing the quantum gate operation of changing the spin state of the electron (the quantum bit), such as the control of the phase of an electron spin of the electron or the operation of the control NOT gate.

In addition, the control device 200 is capable of performing the input and output of the electron (the quantum bit) from the terminals Res1, Out1, Res2, Out2, Res3, Out3, Resy, and Outy of the calculation region 112.

Accordingly, the control device 200 is capable of performing initialization including an operation of confining the quantum bit in the quantum dot, the operation of a rotation gate that is a one-quantum bit gate, and the operation of the control NOT gate that is a two-quantum bit gate, and of outputting the electron (the quantum bit) to the measurement device 300 from the terminals Out1, Out2, and Out3 of the calculation region 112 such that the measurement device 300 measures the state of the electron (the quantum bit). As a result thereof, the quantum information processing system 1 is capable of performing an arbitrary quantum calculation.

Even though it is described above, in the quantum calculation device 100, the calculation layer 110, the first gate electrode layer 120, and the second gate electrode layer 130 form the quantum bit array 100A, as described below. As described above, the quantum bit array 100A includes a plurality of quantum dots capable of confining the electron (the quantum bit) and a plurality of gate electrodes used in the control of the plurality of quantum dots.

In the quantum bit array 100A, a storage region A1, an operation region A2, and a movement region A3 are provided.

The storage region A1 is a region including a plurality of quantum dots storing the electron (the quantum bit). As illustrated in FIG. 4, the storage region A1 includes quantum dots D11 to D31, D12 to D32, and D13 to D33.

The operation region A2 is a region including a plurality of quantum dots capable of applying the quantum gate operation of changing the spin state of the confined electron (quantum bit). As illustrated in FIG. 4, the operation region A2 includes quantum dots D41, D51, D42, D52, D43, and D53.

In addition, the movement region A3 is a region including a quantum dot used in the movement of the electron (the quantum bit). The movement region A3 is provided between the storage region A1 and the operation region A2. As illustrated in FIG. 4, the movement region A3 includes quantum dots Dy1 to Dy3.

The allocation of the storage region A1, the operation region A2, and the movement region A3 is set by the quantum bit processing program 210$a$ of the control device 200. The quantum information processing system 1 is capable of suitably changing the allocation of the storage region A1, the operation region A2, and the movement region A3, in the middle of the processing of the quantum bit processing program 210$a$. For example, the quantum information processing system 1 is capable of changing the size of the storage region A1 in accordance with the number of quantum bits used in the calculation, and of changing the size of the operation region A2 in accordance with the number of quantum dots required for the quantum gate operation. In addition, the quantum information processing system 1 is capable of changing the shape of the movement region A3 in accordance with the contents of the calculation.

Figure 5:
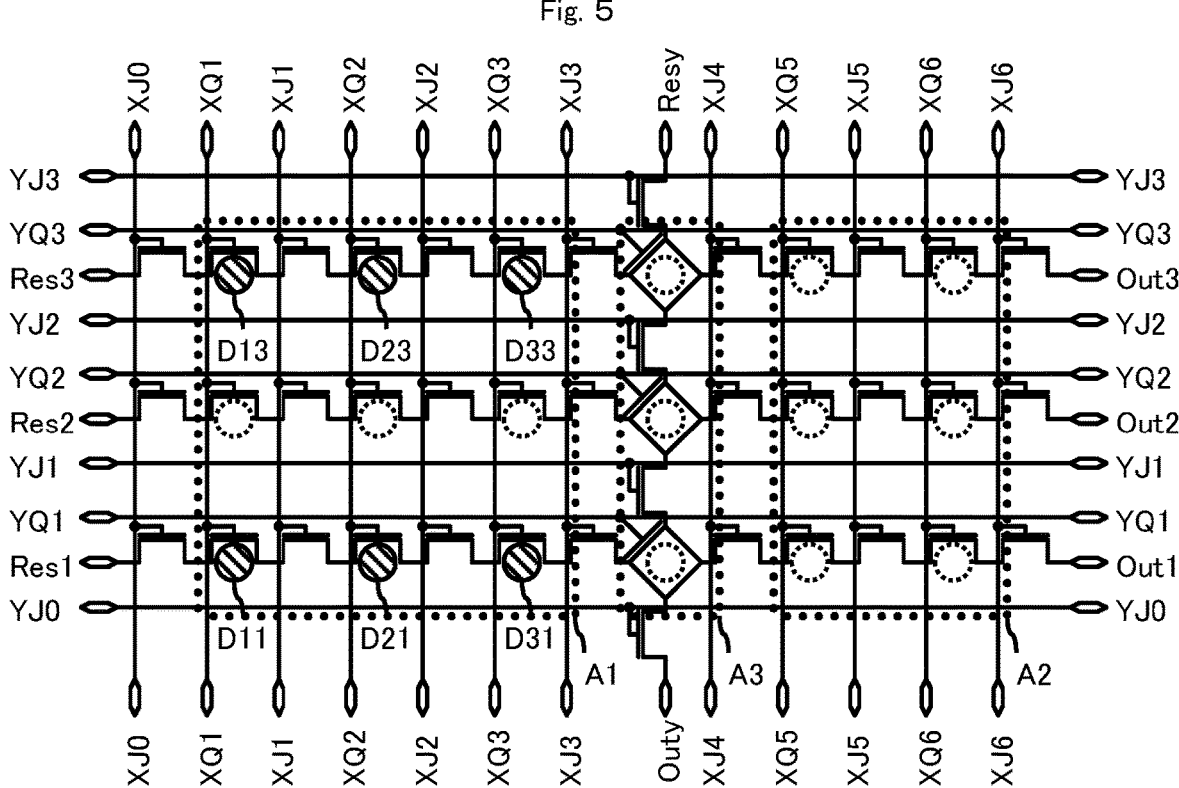
FIG. 5 is an example of a circuit diagram of a quantum bit array of the quantum calculation device in an initial state.

FIG. 5 is an example of a circuit diagram of the quantum bit array 100A of the quantum calculation device 100 in the initial state. As illustrated in FIG. 5, in the initial state, the electron (the quantum bit) is not confined in the quantum dots D12, D22, and D32 in the storage region A1 of the quantum bit array 100A, but the electron (the quantum bit) is confined in the quantum dots D11 to D31 and D13 to D33 in the storage region A1. Similarly, in the quantum bit array 100A, the storage region A1 includes empty quantum dots D12, D22, and D32 not confining the quantum bit. Then, in the quantum bit array 100A, the empty quantum dot not confining the electron (the quantum bit) is arranged around the quantum dot storing the electron (the quantum bit).

Accordingly, as described below, it is easy for the control device 200 to move the electron confined in the quantum dots D11 to D31 and D13 to D33 to the empty quantum dots D12, D22, and D32 not confining the electron and to the movement region A3 and the operation region A2 outside the storage region A1.

The control device 200 moves the electron (the quantum bit) stored in the storage region A1 from the storage region A1 to the operation region A2 by a shuttle operation of moving the electron (the quantum bit) with a Coulomb force generated by using the plurality of gate electrodes, and further performs the quantum gate operation of changing the state of the electron spin (the spin) of the electron (the quantum bit) in the operation region A2.

The shuttle operation is an operation in which electrons (the quantum bit) are moved by Coulomb force by changing the potential around the quantum dot from which the electrons (the quantum bit) are moved. In addition, a shuttle movement is the movement of the electron (the quantum bit) from the quantum dot to the quantum dot by Coulomb force. In the shuttle operation, it is only required to apply a voltage to the plurality of gate electrodes. Thus, the shuttle operation can move electrons (qubits) faster and with higher fidelity than many other gate operations.

The control device 200 is capable of moving the electron (the quantum bit) to the operation region A2. And the control device 200 can perform a quantum gate operation that changes the spin state of electrons, such as operation of a rotation gate that changes the phase of electron spins of electrons and operation of a NOT gate, in the operation area A2.

Figure 6:
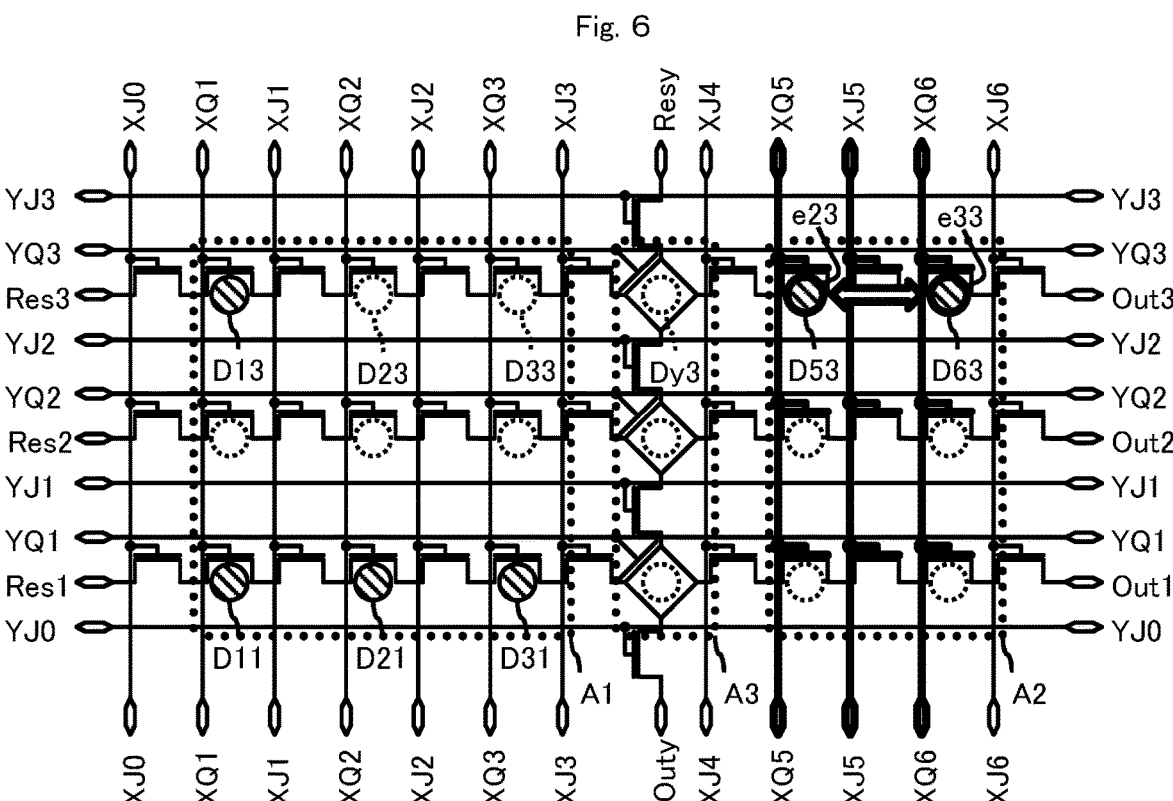
FIG. 6 is a diagram illustrating an operation of a control NOT gate of changing a spin state of an electron of two electrons moved to an operation region.

FIG. 6 is a diagram illustrating the operation of the control NOT gate of changing the spin state of the electron of two electrons moved to the operation region A2. In FIG. 6, in the initial state illustrated in FIG. 5, a circuit diagram of a state in which the electrons confined in the quantum dots D23 and D33 are moved to the quantum dots D53 and D63, respectively, by the shuttle operation is illustrated. In the circuit diagram of FIG. 6, a voltage with a potential different from that in a stationary state is applied to the gate electrodes XQ5, XJ5, and XQ6 on a +Z direction side of the quantum dots D23 and D33, which causes an exchange interaction between electrons e23 and e33 confined in the quantum dots D53 and D63. Further, the control device 200 applies an electromagnetic wave pulse (an RF pulse) of a resonance frequency of the electrons e23 and e33 confined in the quantum dots D53 and D63, and rotates the electron spin of the electrons e23 and e33 to perform the operation of the control NOT gate.

Then, the control device 200 outputs the electrons e23 and e33 after the operation of the control NOT gate to the measurement device 300 from the terminal Out1 of the X portion 112x1 in the calculation region 112, and allows the measurement device 300 to measure the state of the electron (the quantum bit) relevant to the electrons e23 and e33, such as the number of electrons (quantum bits), and then the measurement device 300 to output the measurement result to the control device 200. The state of the electron (the quantum bit) measured by the measurement device 300 is the calculation result of the quantum calculation.

Here, when applying the quantum gate operation, such as the exchange interaction, of changing the state of the electron spin (the spin) to the electron (the quantum bit) existing in the operation region A2 the electron (the quantum bit. e23 and e33 in FIG. 7D. e33 and e31 in FIG. 8G. e21, e31, e23 and e33 in FIG. 9E) existing in the operation region A2 is placed in a static magnetic field of the magnet 140. By a Zeeman effect, it is possible to increase an energy difference between an excitation state and a ground state of the electron (the quantum bit) and the resonance frequency of the electron, existing in the operation region A2 in accordance with the intensity of the static magnetic field.

On the other hand, since the magnetism of the magnet 140 is shielded by the magnetic shield 150, in the electron (the quantum bit, the electrons e11 and e31, and the like) existing in the storage region A1 and in the electron (the quantum bit) existing in the movement region A3, an increase in the resonance frequency due to the static magnetic field of the magnet 140 is suppressed.

In this way, a difference between the resonance frequency of the electron (the quantum bit) existing in the operation region A2 and the resonance frequency of the electron (the quantum bit) existing in the storage region A1 and the movement region A3, increases with the position of the magnet 140 and of the magnetic shield 150. Then, the rotation of the electron spin occurs in a case where the electron is exposed to the electromagnetic wave at the resonance frequency. Accordingly, due to a difference between the resonance frequency of the electron (the quantum bit) existing in the storage region A1 and the movement region A3 and the resonance frequency of the electron (the quantum bit) existing in the operation region A2, the rotation of the electron spin (the spin) of the electron (the quantum bit) existing in the storage region A1 and the movement region A3 is suppressed, even in a case where the electromagnetic wave pulse (the RF pulse) at the resonance frequency of the electron (the quantum bit) existing in the operation region A2 is applied.

Accordingly, the quantum information processing system 1 is capable of suppressing disorder in the state of the electron spin (the spin) of the electron (the quantum bit) existing in the storage region A1 and the movement region A3 by the quantum gate operation of changing the spin state of the electron (the quantum bit) existing in the operation region A2.

Note that, in the quantum information processing system 1, the magnet 140 and the magnetic shield 150 may be omitted. Instead of using the magnet 140, the quantum information processing system 1 applies a voltage from the gate electrode or the like with a predetermined potential onto the quantum dot in which the electron (the quantum bit) existing in the operation region A2 is confined, and thus, by a Stark effect, an energy difference between the excitation state and the ground state of the electron (the quantum bit) existing in the operation region A2 increases, and it is possible to increase the resonance frequency.

In addition, the quantum information processing system 1 applies quantum gate operation to electrons (the quantum bit) e23 and e33 that are the targets of quantum gate operation in the following cases. That is, when the distances between the electrons (the quantum bit) e23, e33 that are the targets quantum gate operation in the operation region A2 and the electrons (the quantum bit) e11 to e13, e21 to e23, e13 in the storage region A1 are larger than the prescribed length. Here, the electrons (the quantum bit) e11 to e13, e21 to e23, e13 are around the electrons (the quantum bit) e23 and e33 that are the targets of quantum gate operation in the operation area A2. And the prescribed length is the length that can suppress the disturbance of spin state of the electrons (the quantum bit) e1 to e13, e21 to e23, e13 in storage area A1 due to quantum gate operation on electrons when quantum gate operation is applied to electrons (the quantum bit) e23, e33 in operation area A2.

Accordingly, the quantum information processing system 1 is capable of suppressing the loss of the coherence of the electrons (the quantum bits) e11 to e13, e21 to e23, and e13 existing in the storage region A1 and around the target electrons (the quantum bits) e23 and e33 of the quantum gate operation. In other words, the quantum information processing system 1 is capable of performing the quantum calculation while suppressing the disorder in the state of the electron spin (the spin) of the electron (the quantum bit).

<<Calculation Example of Quantum Information Processing System 1 (FIG. 5 and FIG. 7A to FIG. 9E)>>

Hereinafter, examples of the quantum calculation of the quantum information processing system 1 will be described. A first calculation example is a case where in the initial state illustrated in FIG. 5, the control device 200 moves the electrons e23 and e33 confined in the quantum dots D23 and D33 in the storage region A1 to the quantum dots D53 and D63 in the operation region A2, respectively, by the shuttle operation, and applies the operation of the control NOT gate to the quantum dots D53 and D63.

A second calculation example is the case of applying the operation of the control NOT gate to the electron e33 confined in the quantum dot D33 in the X portion 112x3 in the calculation region 112, and the electron e33 confined in the quantum dot D31 in the X portion 112x1 in the calculation region 112.

A third calculation example is the case of applying the operation of the control NOT gate to the electrons e23 and e33 confined in the quantum dots D23 and D33 in the X portion 112x3 in the calculation region 112, and applying the operation of the control NOT gate to the electrons e21 and e31 confined in the quantum dots D21 and D31 in the X portion 112x1 in the calculation region 112, in parallel.

The first calculation example 1 is an example that in the initial state illustrated in FIG. 5, the control device 200 moves the electrons e23 and e33 confined in the quantum dots D23 and D33 in the storage region A1 to the quantum dots D53 and D63 in the operation region A2, respectively, by the shuttle operation, and applies the operation of the control NOT gate to the quantum dots D53 and D63.

FIG. 7A to FIG. 7E are circuit diagrams of the quantum calculation device 100 in the process of the processing of the first calculation example.

Figure 7A:
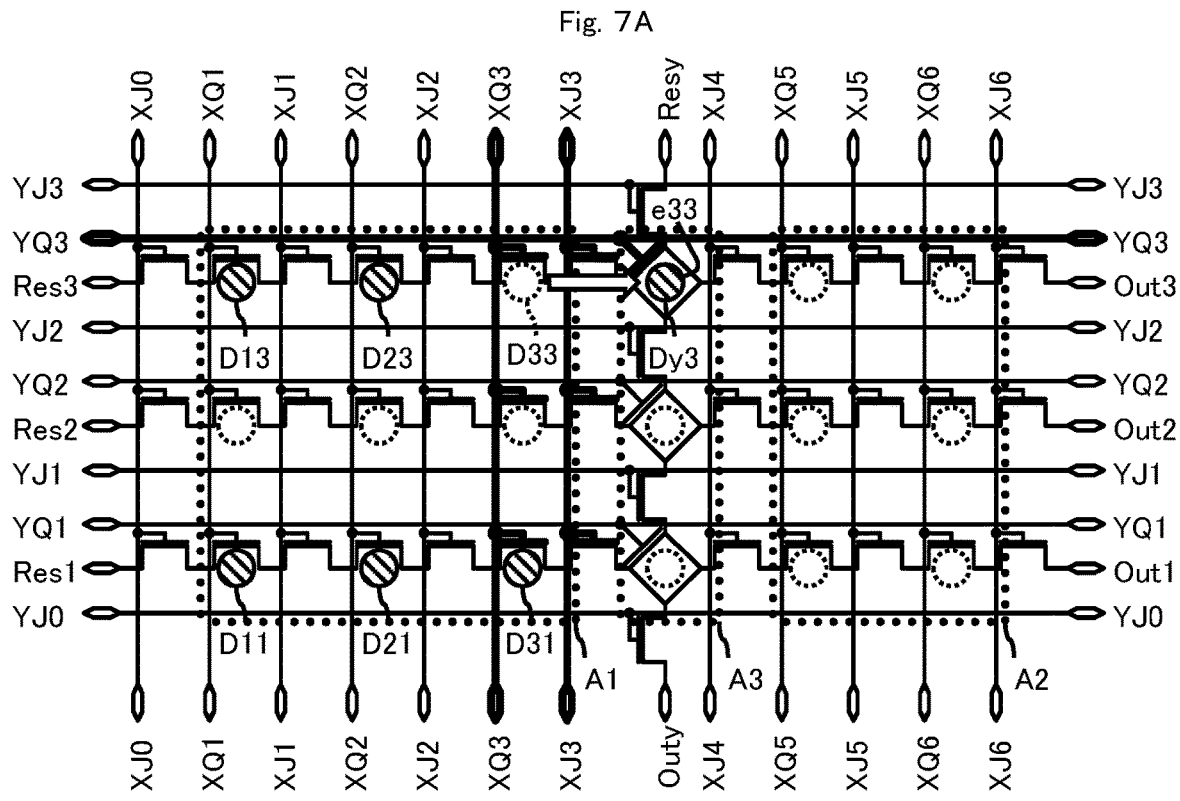
FIG. 7A is a circuit diagram of the quantum calculation device in a process of processing of a first calculation example.

As illustrated in FIG. 7A, in the first calculation example, from the initial state illustrated in FIG. 5, the control device 200 moves the electron e33 confined in the quantum dot D33 in the storage region A1 from the quantum dot D33 to the quantum dot Dy3 in the movement region A3 by the shuttle operation of setting the voltage of the gate electrodes XQ3, XJ3, and YQ3 to a predetermined potential.

The electron has a negative charge. In the shuttle operation, the potential of the gate electrode on the quantum dot is set to (1) to (3) described below such that the electron is moved with the Coulomb force.

(1) Set the potential of the gate electrode on the quantum dot D which confine the electron (a quantum bit) before moving, to be lower. So that the electron confined in the quantum dot D before moving becomes easier to move.

(2) Set the potential of the gate electrode on the quantum dot B, which acts as a potential barrier, to be higher. Here, the quantum dot B is adjacent to the quantum dot D on the side of the direction in which the electrons in the quantum dot D move. So that the electron (a quantum bit) confined in the quantum dot D and before moving, can move beyond quantum dot B, which acts as a potential barrier.

(3) Set the potential of the gate electrode on the quantum dot D which confine the electron (a quantum bit) after moving, to be higher. So that the electron confined in the quantum dot D before moving is attracted by the Coulomb force to the quantum dot D that the electron moves to.

In the example illustrated in FIG. 7A, as the shuttle operation, the gate electrode is set to (7A1) to (7A3) described below.

(7A1) Set the potential of the gate electrode XQ3 on the quantum dot D33 which confine the electron (a quantum bit) e33 before moving, to be lower. So that the electron e33 confined in the quantum dot D33 before moving becomes easier to move.

(7A2) Set the potential of the gate electrode XJ3 on the quantum dot B33, which acts as a potential barrier, to be higher. Here, the quantum dot B33 is adjacent to the quantum dot D33 on the side of the direction in which the electron e33 in the quantum dot D33 move. So that the electron (a quantum bit) e33 confined in the quantum dot D33 and before moving, can move beyond quantum dot B33, which acts as a potential barrier.

(7A3) Set the potential of the gate electrode YQ3 on the quantum dot Dy3 which confine the electron (a quantum bit) e33 after moving, to be higher. So that the electron e33 confined in the quantum dot D33 before moving is attracted by the Coulomb force to the quantum dot Dy3 that the electron moves to.

Figure 7B:
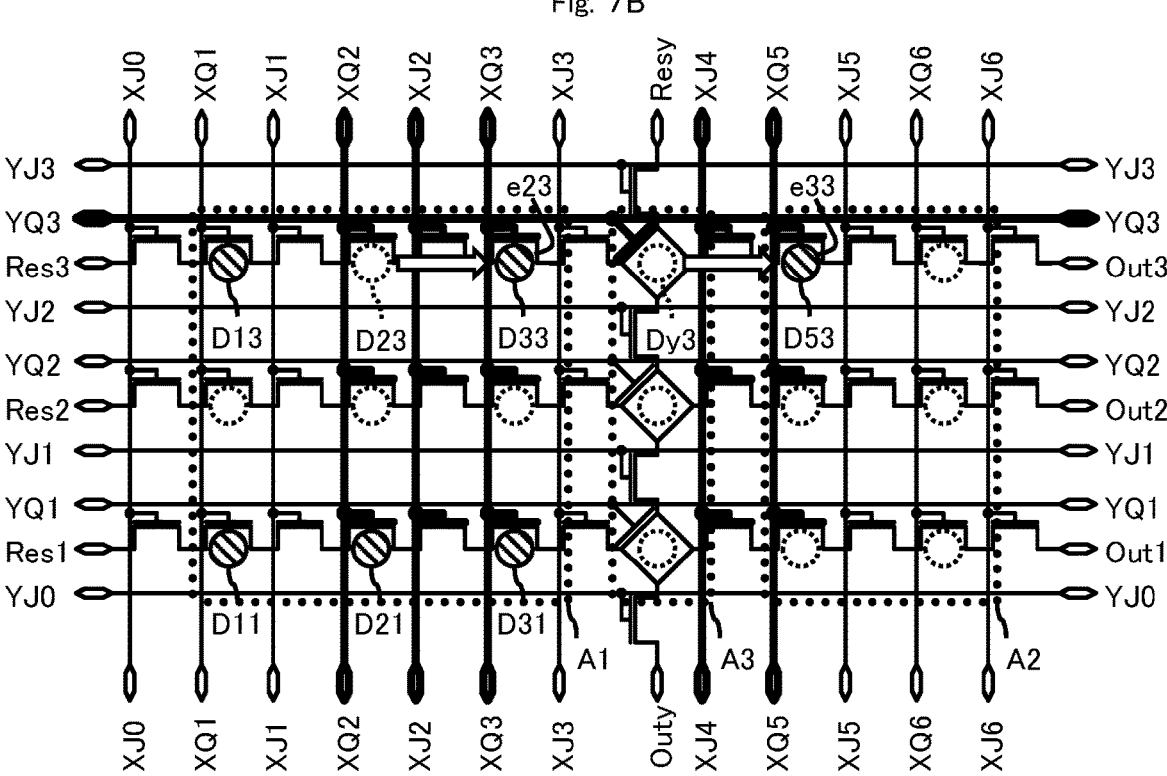
FIG. 7B is a circuit diagram of the quantum calculation device in the process of the processing of the first calculation example.

Next, as illustrated in FIG. 7B, the control device 200 (7B1) moves the electron e23 confined in the quantum dot D23 in the storage region A1 from the quantum dot D23 to the quantum dot D33 by the shuttle operation, and (7B2) moves the electron e33 moved to the quantum dot Dy3 of the movement region A3 from the quantum dot Dy3 in the movement region A3 to the quantum dot D53 in the operation region A2 by the shuttle operation.

Here, as the shuttle operation, the control device 200 applies a voltage such that the gate electrodes XQ2, XJ2, and XQ3 have a predetermined potential in order to (7B1) move the electron e23 from the quantum dot D23 to the quantum dot D33. Simultaneously, the control device 200 applies a voltage such that the gate electrodes YQ3, XJ4, and XQ5 have a predetermined potential in order to (7B2) move the electron e33 from the quantum dot Dy3 to the quantum dot D53. More specifically, The control device 200 lowers the potential of the gate electrode XQ2, raises the potential of the gate electrode XJ2, raises the potential of the gate electrode XQ3, lowers the potential of the gate electrode YQ3, raises the potential of the gate electrode XJ4, and raises the potential of the gate electrode XQ5. Here, since the protrusion Ya of the gate electrode YQ3 is on the quantum dot Dy3 which confine the electron e33 before moving, the control device 200 set the potential of the gate electrode YQ3 to be lower.

Figure 7C:
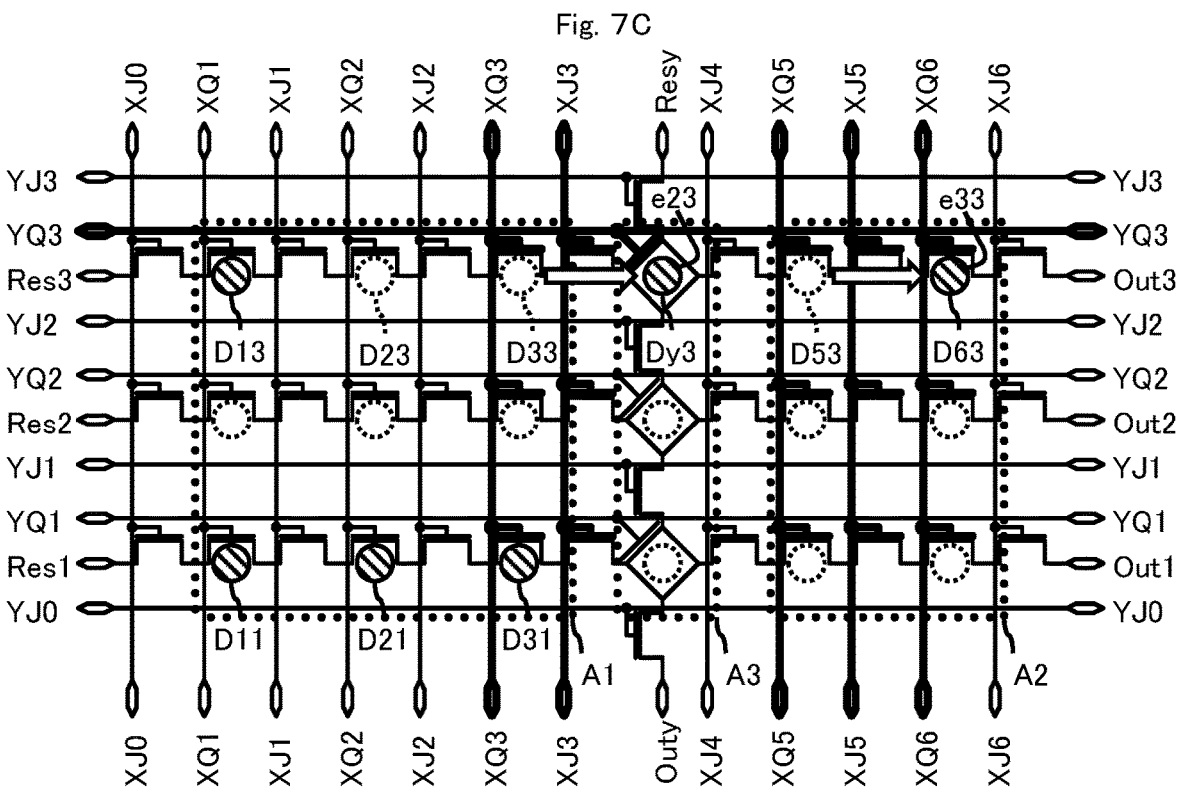
FIG. 7C is a circuit diagram of the quantum calculation device in the process of the processing of the first calculation example.

Next, as illustrated in FIG. 7C, the control device 200 (7C1) moves the electron e23 confined in the quantum dot D33 from the quantum dot D23 to the quantum dot Dy3 by the shuttle operation, and (7B2) moves the electron e33 moved to the quantum dot D53 from the quantum dot D53 to the quantum dot D63 by the shuttle operation.

Here, as the shuttle operation, the control device 200 applies a voltage such that the gate electrodes XQ3, XJ3, and YQ3 have a predetermined potential in order to (7C1) move the electron e23 from the quantum dot D33 to the quantum dot Dy3. Simultaneously, the control device 200 applies a voltage such that the gate electrodes XQ5, XJ5, and XQ6 have a predetermined potential in order to (7C2) move the electron e33 from the quantum dot D53 to the quantum dot D63. More specifically, the control device 200 lowers the potential of the gate electrode XQ3, raises the potential of the gate electrode XJ3, raises the potential of the gate electrode YQ3, lowers the potential of the gate electrode YQ5, raises the potential of the gate electrode XJ5, and raises the potential of the gate electrode XQ6.

Figure 7D:
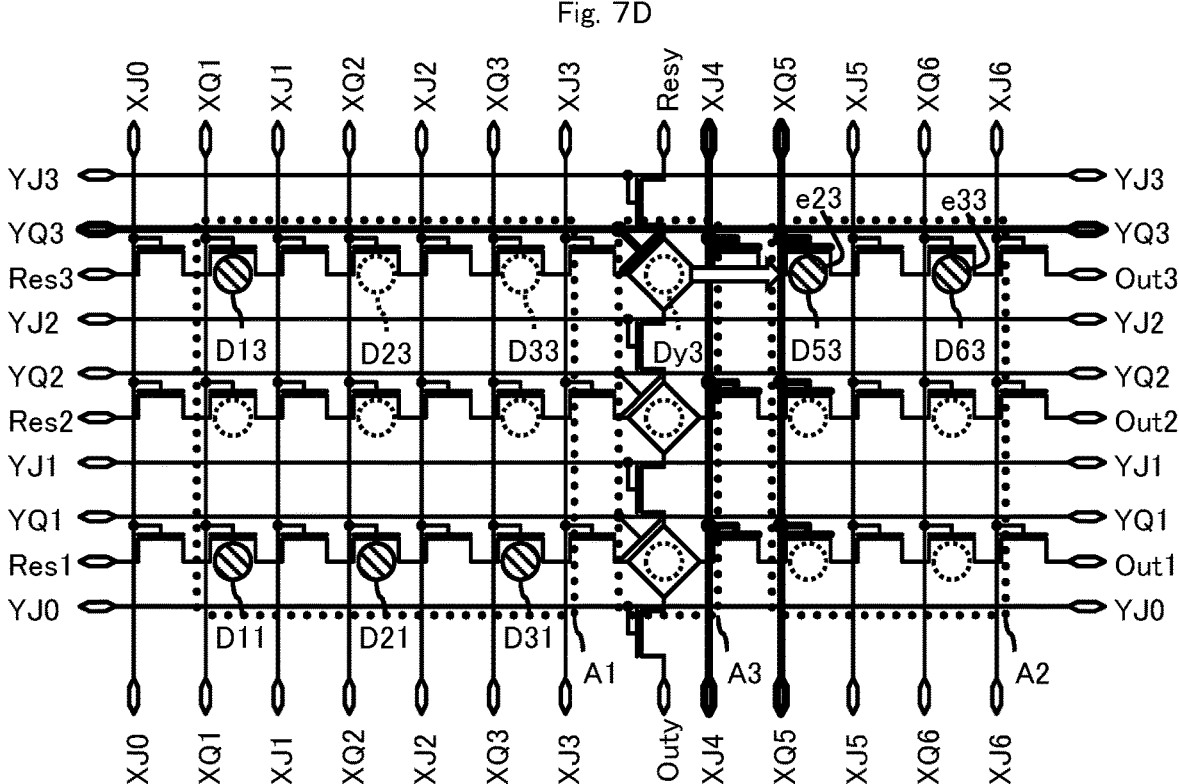
FIG. 7D is a circuit diagram of the quantum calculation device in the process of the processing of the first calculation example.

Next, as illustrated in FIG. 7D, the control device 200 moves the electron e23 moved to the quantum dot Dy3 from the quantum dot Dy3 to the quantum dot D53 by the shuttle operation.

Here, as the shuttle operation, the control device 200 applies a voltage such that the gate electrodes YQ3, XJ4, and XQ5 have a predetermined potential in order to move the electron e23 from the quantum dot Dy3 to the quantum dot D53. More specifically, the control device 200 lowers the potential of the gate electrode YQ3, raises the potential of the gate electrode XJ4, and raises the potential of the gate electrode XQ5.

Figure 7E:
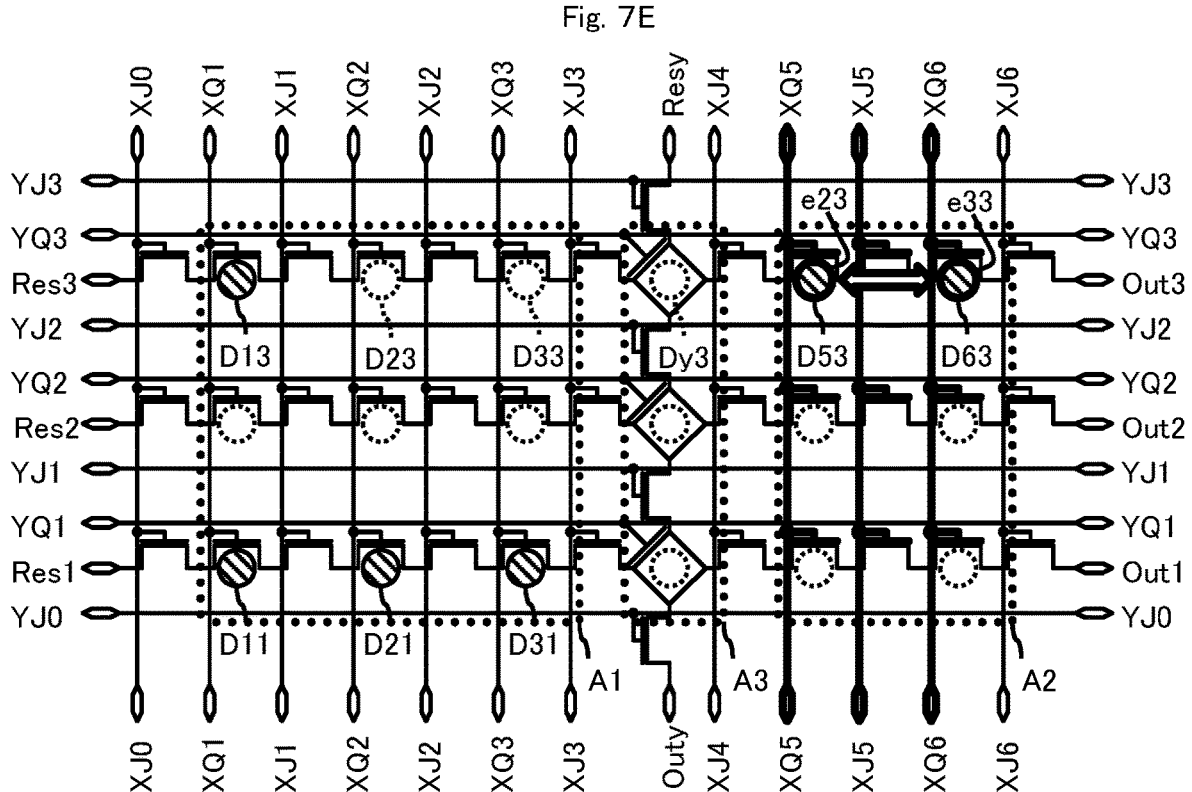
FIG. 7E is a circuit diagram of the quantum calculation device in the process of the processing of the first calculation example.

As described above, the electrons e23 and e33 confined in the quantum dots D23 and D33 in the storage region A1 are moved to the quantum dots D53 and D63 in the operation region A2 by the shuttle operation. As illustrated in FIG. 7E, the operation of the control NOT gate described by using FIG. 5 can be performed to the electrons e23 and e33 moved to the quantum dots D53 and D63.

Then, as described by using FIG. 5, the control device 200 performs the operation of the control NOT gate to the electrons e23 and e33 moved to the quantum dots D53 and D63.

Finally, the control device 200 outputs the electrons e23 and e33 after the operation of the control NOT gate to the measurement device 300 from the terminal Out3 in the X portion 112x3 in the calculation region 112, and allows the measurement device 300 to measure the state of the electron (the quantum bit) relevant to the electrons e23 and e33, such as the number of electrons (quantum bits), and to output the measurement result to the control device 200. The state of the electron (the quantum bit) measured by the measurement device 300 is the calculation result of the quantum calculation.

Second Calculation Example (FIG. 8A to FIG. 8G)

The first calculation example described above is the case of performing the operation of the control NOT gate to the electrons e23 and e33 confined in the quantum dots D23 and D33 of the X portion 112x3 in the calculation region 112. In contrast, the second calculation example is the case of performing the operation of the control NOT gate to the electron e33 confined in the quantum dot D33 in the X portion 112x3 in the calculation region 112 and the electron e33 confined in the quantum dot D31 in the X portion 112x1 in the calculation region 112.

FIG. 8A to FIG. 8G are circuit diagrams of the quantum calculation device 100 in the process of the processing of the second calculation example.

Figure 8A:
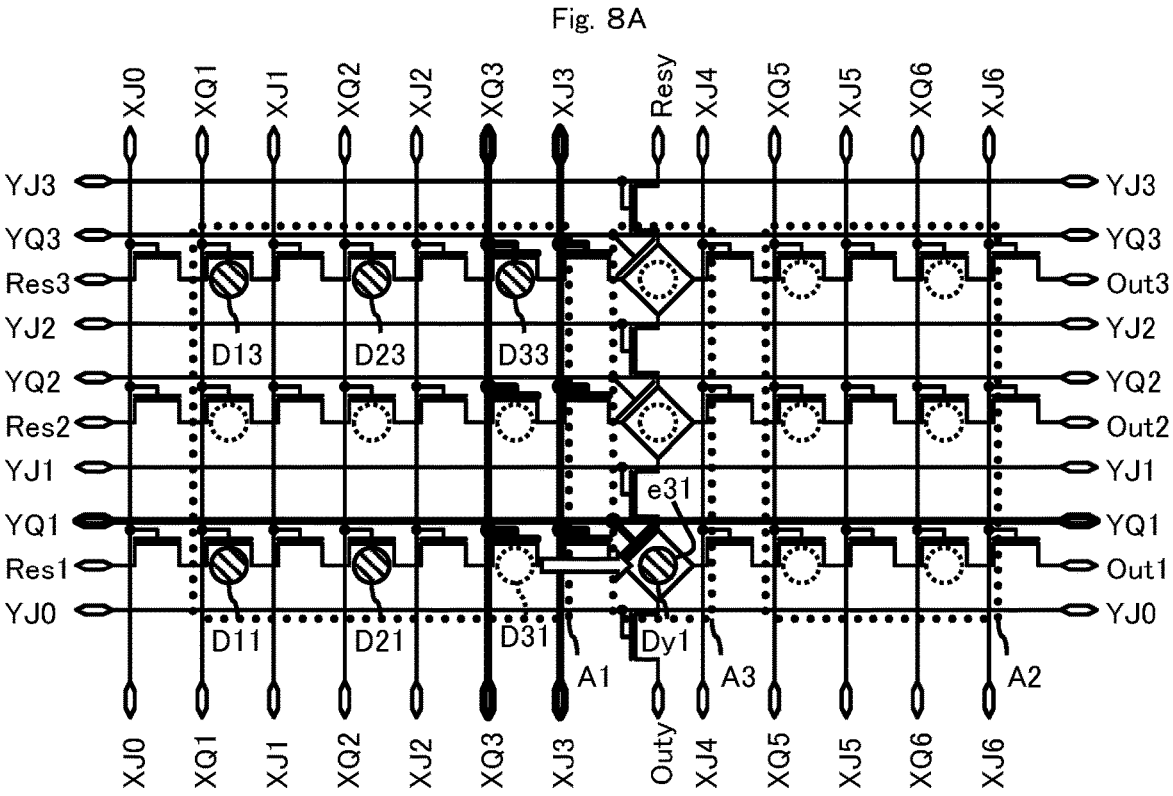
FIG. 8A is a circuit diagram of the quantum calculation device in a process of processing of a second calculation example.

As illustrated in FIG. 8A, in the second calculation example, from the initial state illustrated in FIG. 5, the control device 200 moves the electron e31 confined in the quantum dot D31 in the storage region A1 from the quantum dot D31 to the quantum dot Dy1 in the movement region A3 by the shuttle operation.

Here, as the shuttle operation, the control device 200 applies a voltage to the gate electrodes XQ3, XJ3, and YQ1. The control device 200 lower the potential of the gate electrode XQ3, raise the potential of the gate electrode XJ3, and raise the potential of the gate electrode YQ1.

Figure 8B:
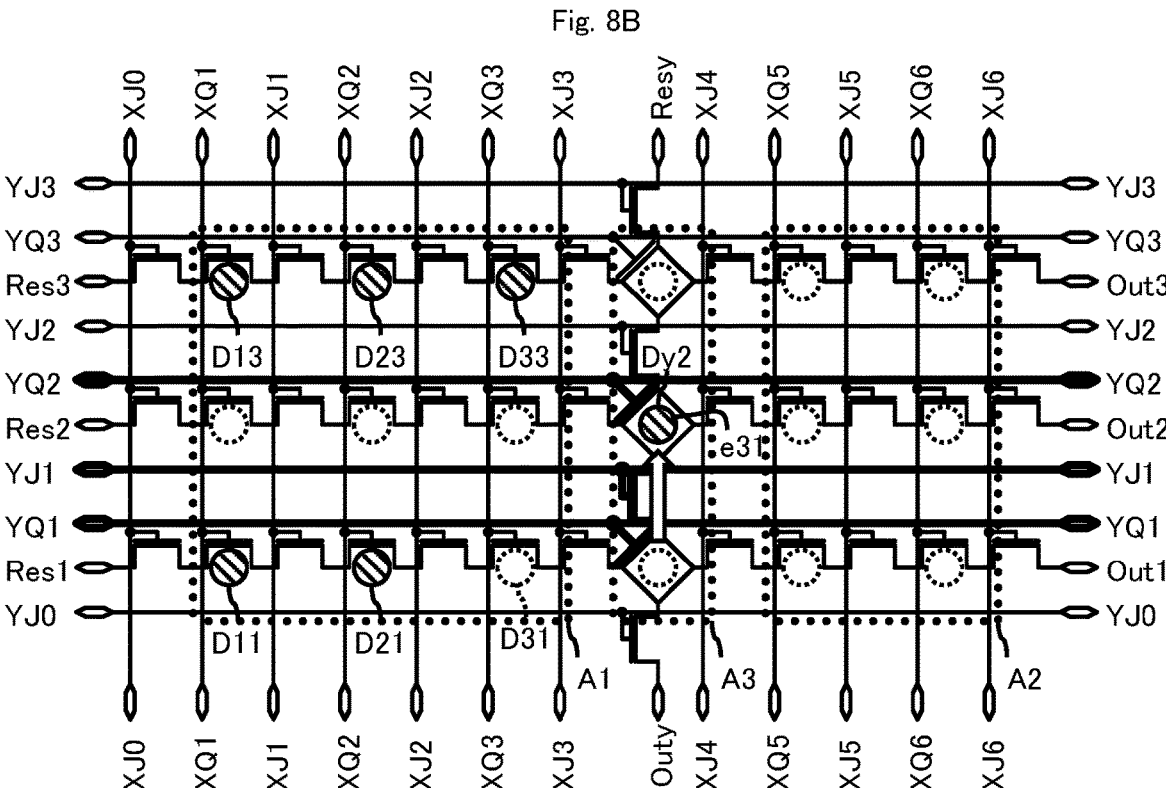
FIG. 8B is a circuit diagram of the quantum calculation device in the process of the processing of the second calculation example.

Next, as illustrated in FIG. 8B, the control device 200 moves the electron e31 moved to the quantum dot Dy1 from the quantum dot Dy1 to the quantum dot Dy2 by the shuttle operation. Here, as the shuttle operation, the control device 200 applies a voltage to the gate electrodes YQ1, YJ1, and YQ2. The control device 200 lowers the potential of the gate electrode YQ1, raises the potential of the gate electrode YJ1, and raises the potential of the gate electrode YQ2.

Figure 8C:
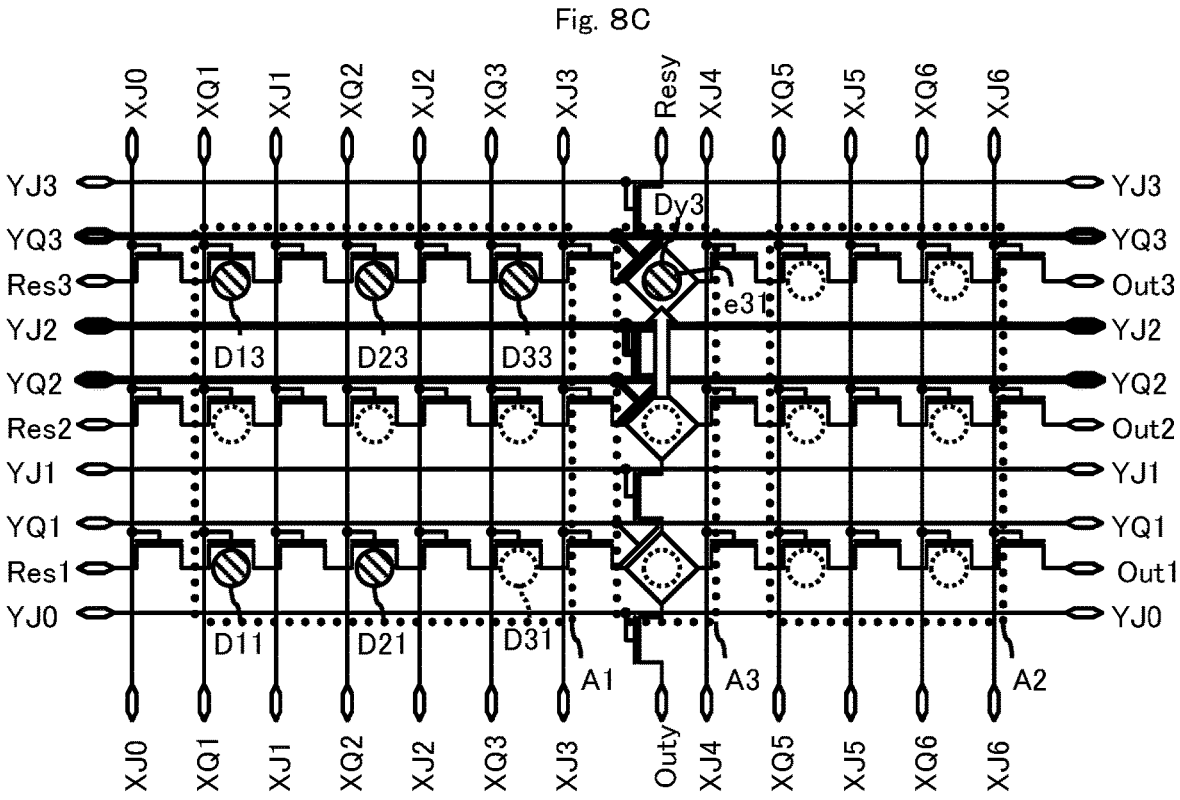
FIG. 8C is a circuit diagram of the quantum calculation device in the process of the processing of the second calculation example.

Next, as illustrated in FIG. 8C, the control device 200 moves the electron e31 moved to the quantum dot Dy2 from the quantum dot Dy2 to the quantum dot Dy3 by the shuttle operation. Here, as the shuttle operation, the control device 200 applies a voltage to the gate electrodes XQ2, YJ2, and YQ3. The control device 200 lowers the potential of the gate electrode YQ2, raises the potential of the gate electrode YJ2, and raises the potential of the gate electrode YQ3.

Figure 8D:
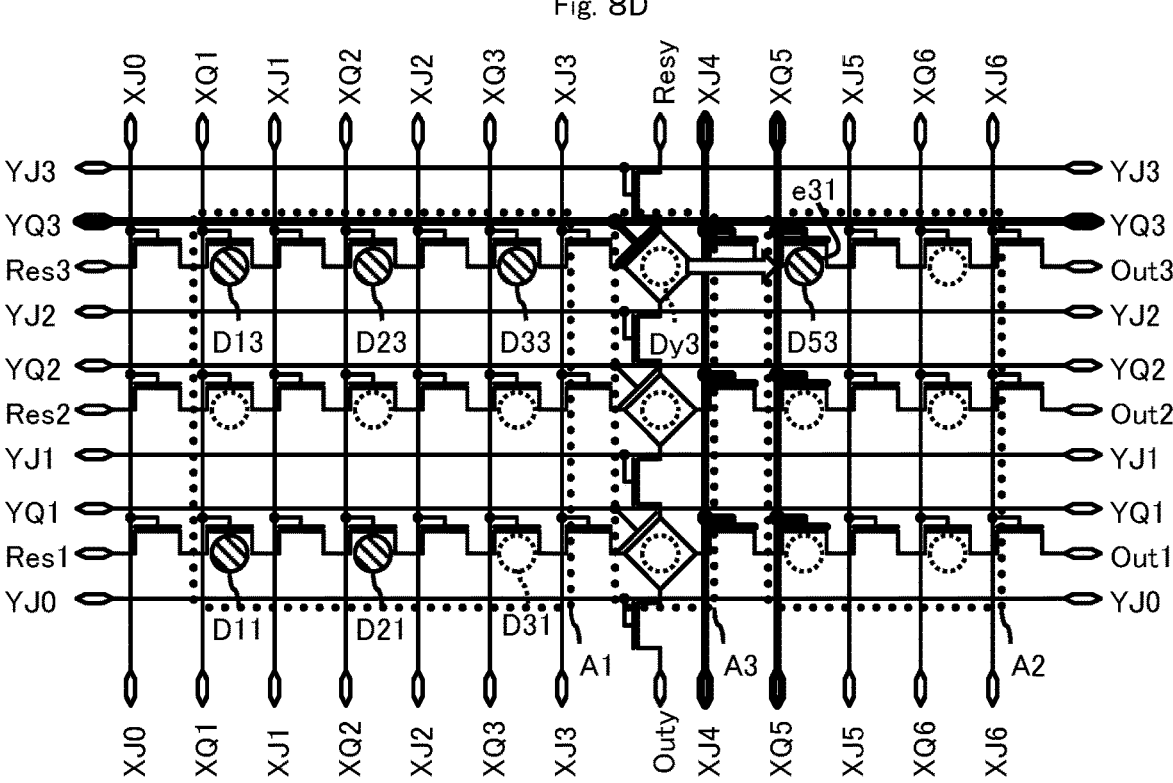
FIG. 8D is a circuit diagram of the quantum calculation device in the process of the processing of the second calculation example.

Next, as illustrated in FIG. 8D, the control device 200 moves the electron e31 moved to the quantum dot Dy3 from the quantum dot Dy3 to the quantum dot D53 in the operation region A2 by the shuttle operation. Here, as the shuttle operation, the control device 200 applies a voltage to the gate electrodes YQ3, XJ4, and XQ5. The control device 200 lowers the potential of the gate electrode YQ3, raises the potential of the gate electrode XJ4, and raises the potential of the gate electrode XQ5.

Figure 8E:
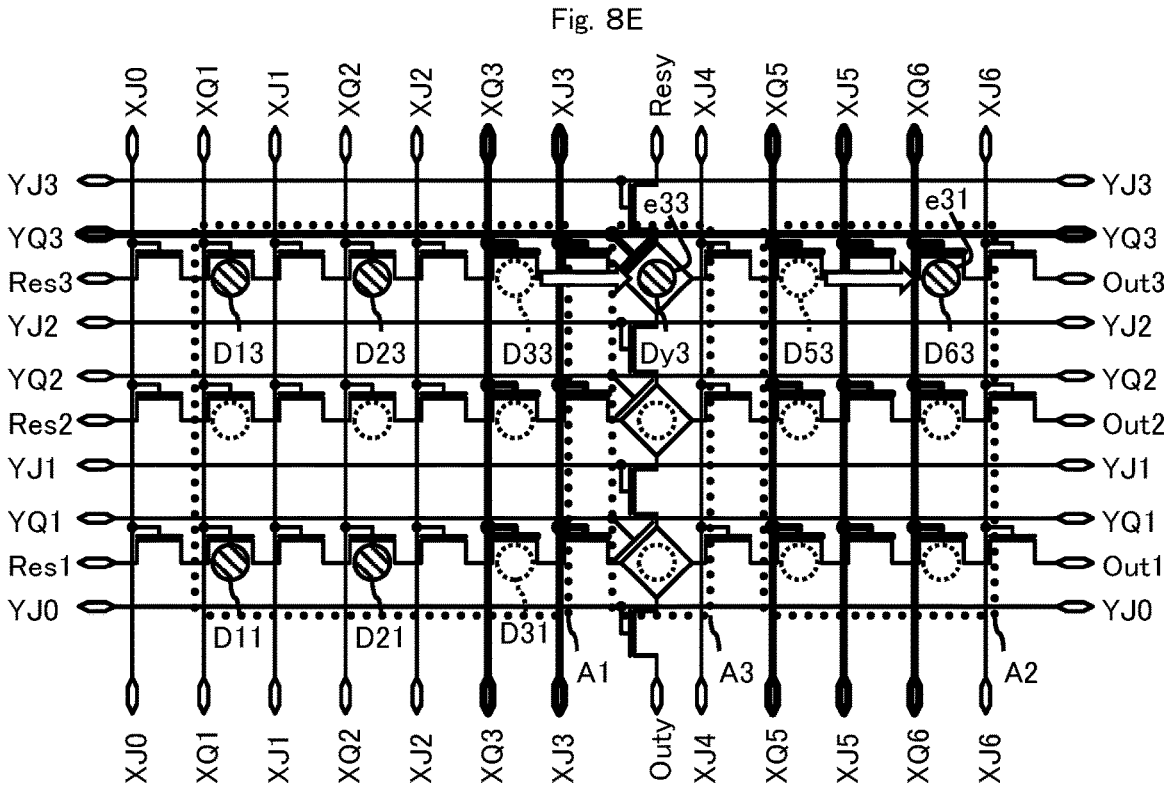
FIG. 8E is a circuit diagram of the quantum calculation device in the process of the processing of the second calculation example.

Next, as illustrated in FIG. 8E, the control device 200 (8E1) moves the electron e31 moved to the quantum dot D53 from the quantum dot D53 to the quantum dot D63 by the shuttle operation. simultaneously, the control device 200 (8E2) moves the electron e33 confined in the quantum dot D33 in the storage region A1 from the quantum dot D33 to the quantum dot Dy3 in the movement region A3 by the shuttle operation.

Here, as the shuttle operation, the control device 200 (8E1) applies a voltage to the gate electrodes XQ5, XJ5, and XQ6. The control device 200 lowers the potential of the gate electrode XQ5, raises the potential of the gate electrode XJ5, and raises the potential of the gate electrode XQ6. And, as the shuttle operation, the control device 200 (8E2) applies a voltage to the gate electrodes XQ3, XJ3, and YQ3. The control device 200 lowers the potential of the gate electrode XQ3, raises the potential of the gate electrode XJ3, and raises the potential of the gate electrode YQ3.

Figure 8F:
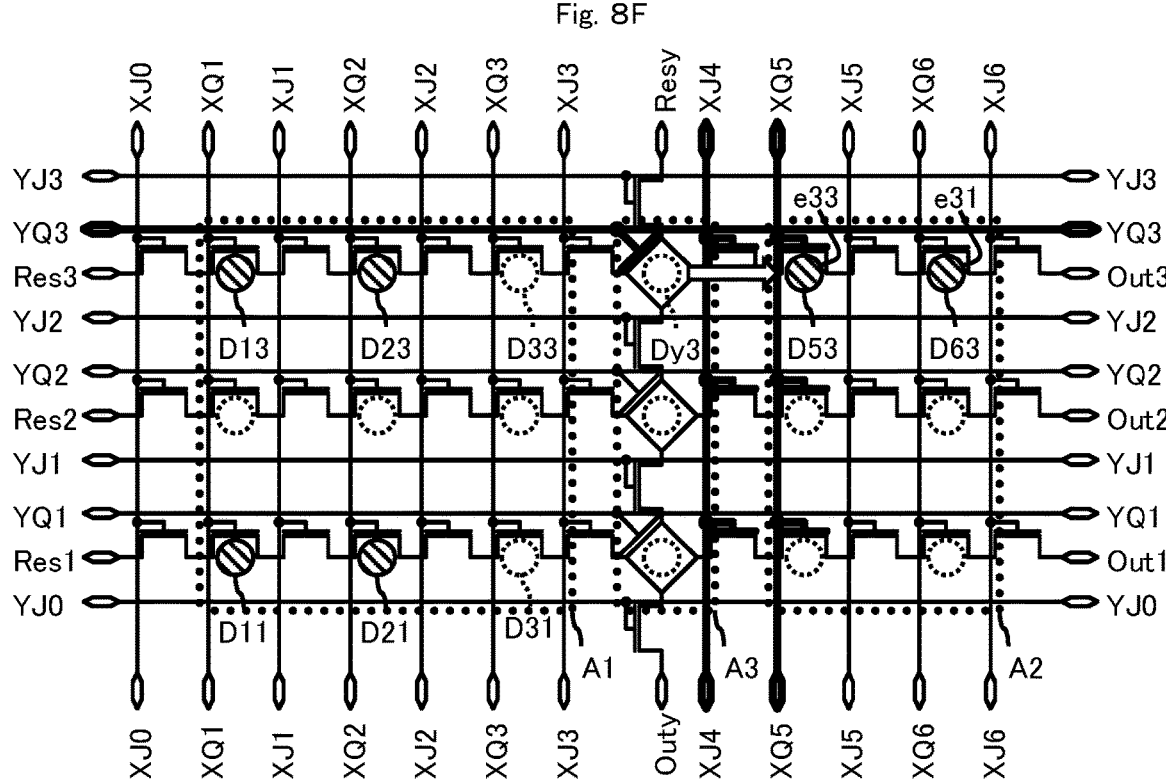
FIG. 8F is a circuit diagram of the quantum calculation device in the process of the processing of the second calculation example.

Next, as illustrated in FIG. 8F, the control device 200 moves the electron e33 moved to the quantum dot Dy3 from the quantum dot Dy3 to the quantum dot D53 in the operation region A2 by the shuttle operation. Here, as the shuttle operation, the control device 200 applies a voltage to the gate electrodes YQ3, XJ4, and XQ5. The control device

200 lowers the potential of the gate electrode YQ3, raises the potential of the gate electrode XJ4, and raises the potential of the gate electrode XQ5.

Figure 8G:
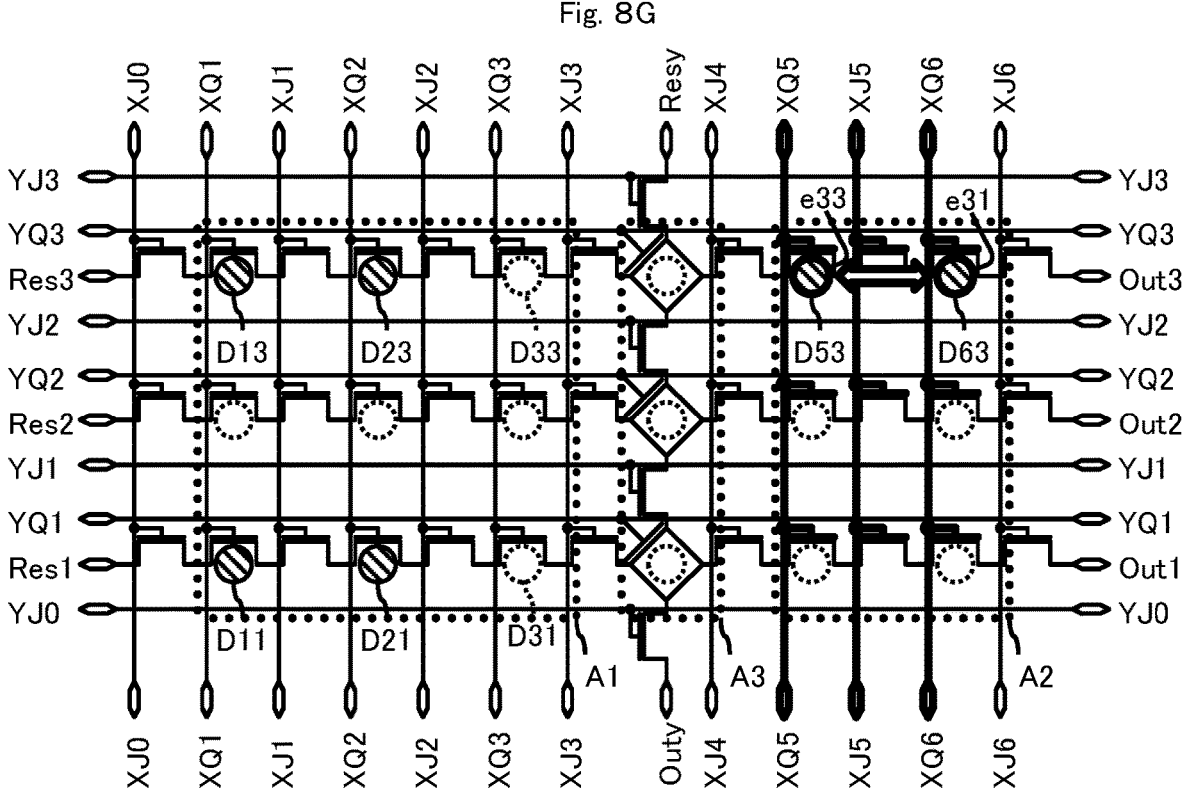
FIG. 8G is a circuit diagram of the quantum calculation device in the process of the processing of the second calculation example.

As described above, the electrons e31 and e33 confined in the quantum dots D31 and D33 in the storage region A1 are moved to the quantum dots D63 and D53 in the operation region A2 by the shuttle operation. As illustrated in FIG. 8G, the operation of the control NOT gate described by using FIG. 5 can be performed to the electrons e31 and e33 moved to the quantum dots D63 and D53.

Then, as described by using FIG. 5, the control device 200 performs the operation of the control NOT gate to the electrons e31 and e33 moved to the quantum dots D63 and D53.

Finally, the control device 200 outputs the electrons e31 and e33 after the operation of the control NOT gate to the measurement device 300 from the terminal Out3 of the X portion 112x3 in the calculation region 112, and allows the measurement device 300 to measure the state of the electron (the quantum bit) relevant to the electrons e31 and e33, such as the number of electrons (quantum bits), and to output the measurement result to the control device 200. The state of the electron (the quantum bit) measured by the measurement device 300 is the calculation result of the quantum calculation.

Third Calculation Example (FIG. 9A to FIG. 9E)

The first calculation example and the second calculation example described above are the case of performing the operation of the control NOT gate of two electrons e. In contrast, the third calculation example is the case of performing the operation of the control NOT gate to the electrons e23 and e33 confined in the quantum dots D23 and D33 in the X portion 112x3 in the calculation region 112, and the operation of the control NOT gate to the electrons e21 and e31 confined in the quantum dots D21 and D31 in the X portion 112x1 in the calculation region 112, in parallel.

FIG. 9A to FIG. 9E are circuit diagrams of the quantum calculation device 100 in the process of the processing of the third calculation example.

Figure 9A:
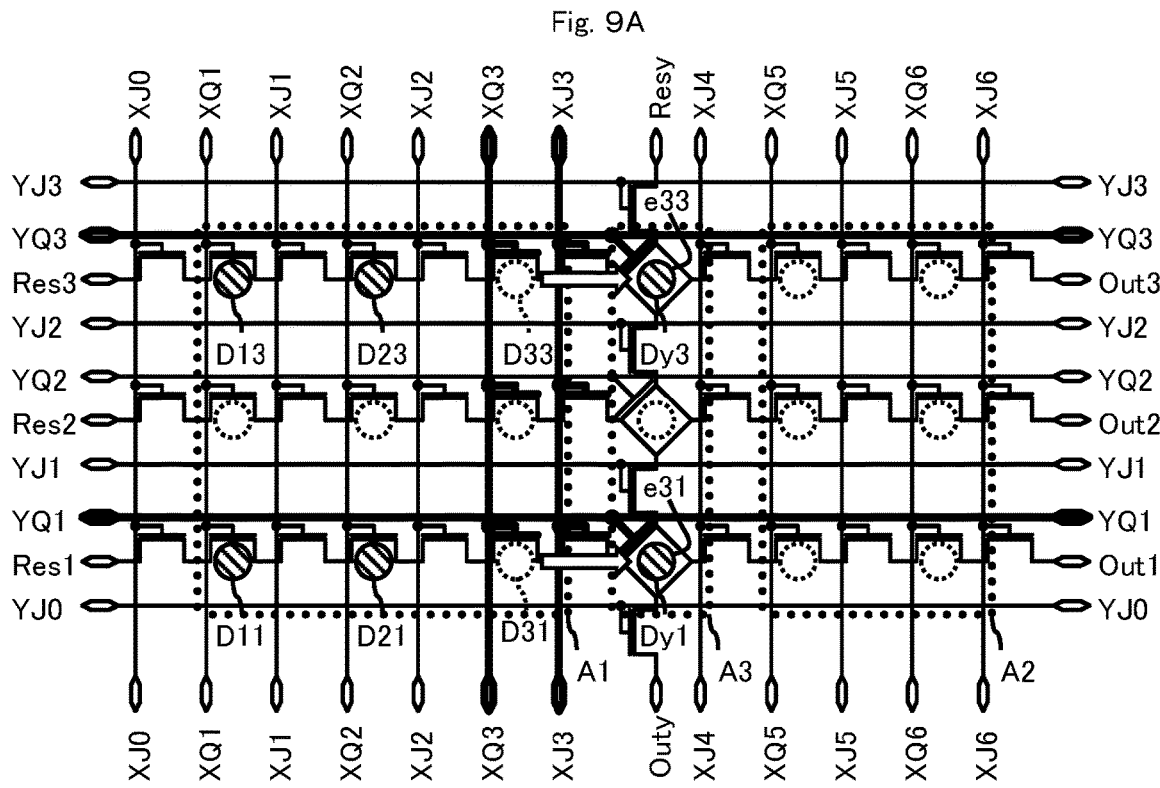
FIG. 9A is a circuit diagram of the quantum calculation device in a process of processing of a third calculation example.

As illustrated in FIG. 9A, in the third calculation example, from the initial state illustrated in FIG. 5, the control device 200 (9A1) moves the electron e31 confined in the quantum dot D31 in the storage region A1 from the quantum dot D31 to the quantum dot Dy1 in the movement region A3 by the shuttle operation. Simultaneously, the control device 200 (9A2) moves the electron e33 confined in the quantum dot D33 in the storage region A1 from the quantum dot D33 to the quantum dot Dy3 in the movement region A3 by the shuttle operation.

Here, as the shuttle operation, the control device 200 applies a voltage to the gate electrodes XQ2, XJ3, YQ1 and, YQ3. The control device 200 lowers the potential of the gate electrode XQ2, raises the potential of the gate electrode XJ3, and raises the potential of the gate electrode YQ1 and YQ3.

Figure 9B:
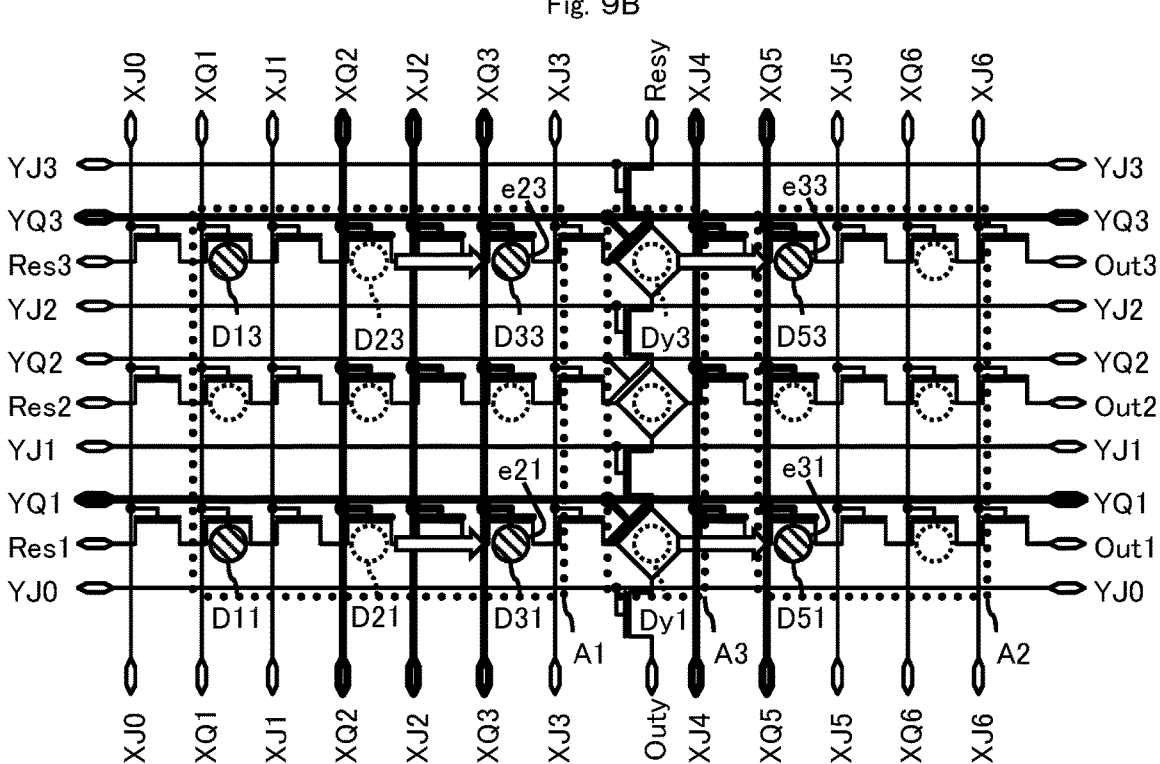
FIG. 9B is a circuit diagram of the quantum calculation device in the process of the processing of the third calculation example.

Next, as illustrated in FIG. 9B, the control device 200 (9B1) moves the electron e31 moved to the quantum dot Dy1 from the quantum dot Dy1 to the quantum dot D51 in the operation region A2 by the shuttle operation. Simultaneously, the control device 200 (9B2) moves the electron e21 confined in the quantum dot D21 in the storage region A1 from the quantum dot D21 to the quantum dot D31 by the shuttle operation.

Simultaneously, the control device 200 (9B3) moves the electron e33 moved to the quantum dot Dy3 from the quantum dot Dy3 to the quantum dot D53 in the operation region A2 by the shuttle operation. In addition, Simultaneously, the control device 200 (9B4) moves the electron e23 confined in the quantum dot D23 in the storage region A1 from the quantum dot D23 to the quantum dot D33 by the shuttle operation.

Here, as the shuttle operation of (9B1) and (9B3), the control device 200 applies a voltage to the gate electrodes YQ1, YQ3, XJ4, and XQ5. The control device 200 lowers the potential of the gate electrode YQ1 and YQ3, raises the potential of the gate electrode XJ4, and raises the potential of the gate electrode XQ5.

Simultaneously, as the shuttle operation of (9B2) and (9B4), the control device 200 applies a voltage to the gate electrodes XQ2, XJ2, and XQ3 The control device 200 lowers the potential of the gate electrode XQ2, raises the potential of the gate electrode XJ2, and raises the potential of the gate electrode XQ3.

Figure 9C:
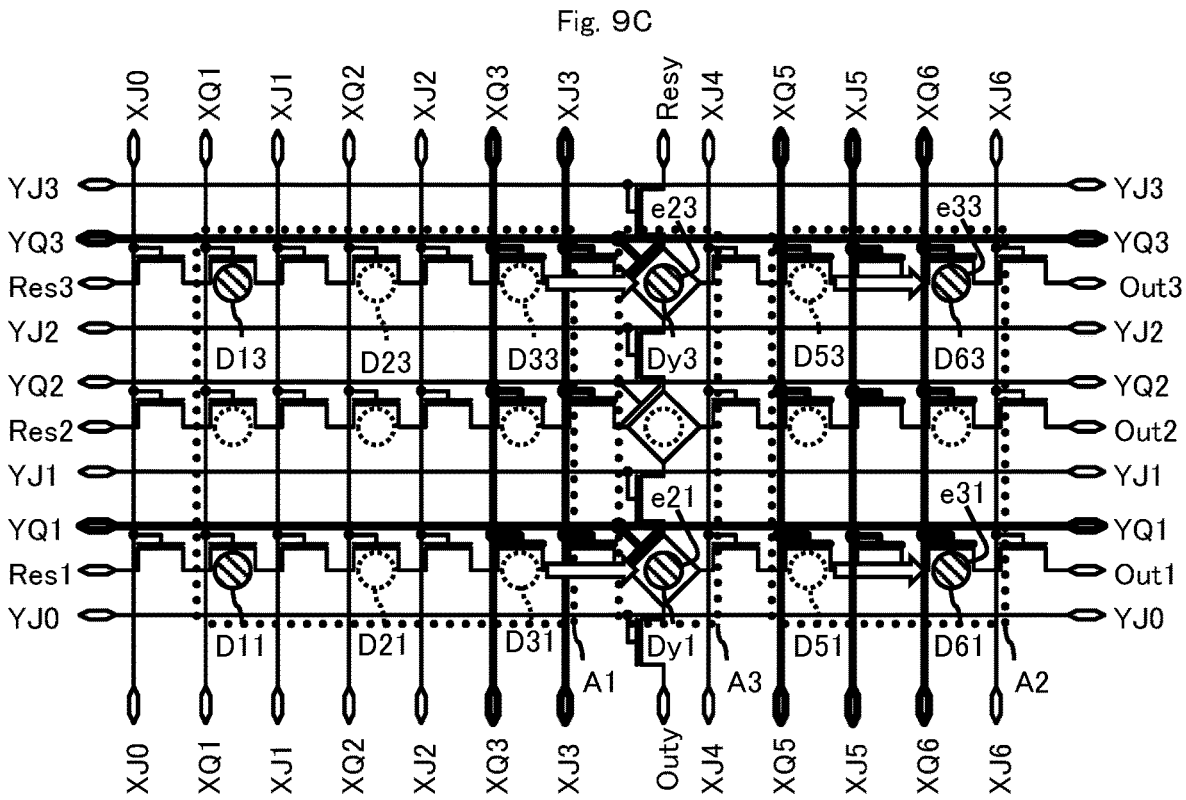
FIG. 9C is a circuit diagram of the quantum calculation device in the process of the processing of the third calculation example.

Next, as illustrated in FIG. 9C, the control device 200 (9C1) moves the electron e31 moved to the quantum dot D51 from the quantum dot D51 to the quantum dot D61 by the shuttle operation. Simultaneously, the control device 200 (9C2) moves the electron e21 moved to the quantum dot D31 from the quantum dot D31 in the storage region A1 to the quantum dot Dy1 in the movement region A3 by the shuttle operation.

In addition, simultaneously, the control device 200 (9C3) moves the electron e33 moved to the quantum dot D53 from the quantum dot D53 to the quantum dot D63 by the shuttle operation. Simultaneously, the control device 200 (9C4) moves the electron e23 moved to the quantum dot D33 from the quantum dot D33 in the storage region A1 to the quantum dot Dy3 in the movement region A3 by the shuttle operation.

Here, as the shuttle operation of (9C1) and (9C3), the control device 200 applies a voltage to the gate electrodes XQ5, XJ5, and XQ6. The control device 200 lowers the potential of the gate electrode XQ5, raises the potential of the gate electrode XJ5, and raises the potential of the gate electrode XQ6.

Simultaneously, as the shuttle operation of (9C2) and (9C4), the control device 200 applies a voltage to the gate electrodes XQ3, XJ3, YQ1 and YQ3. The control device 200 lowers the potential of the gate electrode XQ3, raises the potential of the gate electrode XJ3, and raises the potential of the gate electrode YQ1 and YQ3.

Figure 9D:
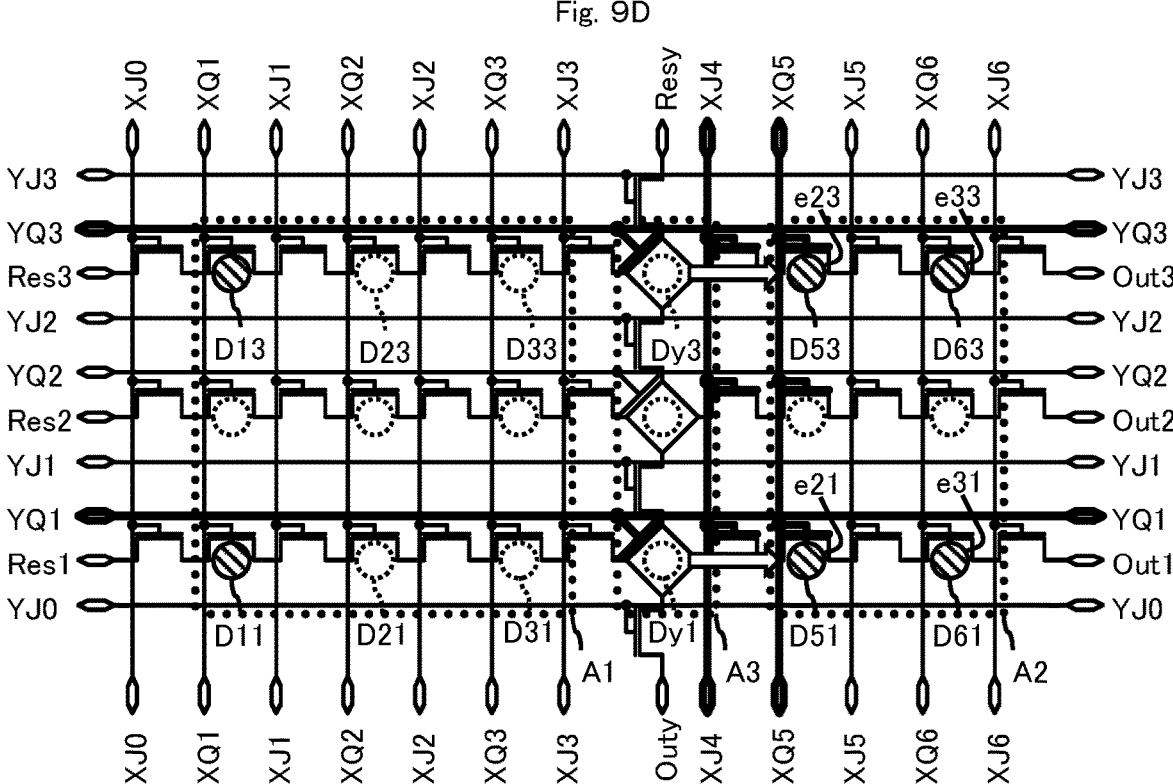
FIG. 9D is a circuit diagram of the quantum calculation device in the process of the processing of the third calculation example.

Next, as illustrated in FIG. 9D, the control device 200 (9D1) moves the electron e21 moved to the quantum dot Dy1 from the quantum dot Dy1 in the movement region A3 to the quantum dot D51 in the operation region A2 by the shuttle operation. Simultaneously, the control device 200 (9D2) moves the electron e23 moved to the quantum dot Dy3 from the quantum dot Dy3 in the movement region A3 to the quantum dot D53 in the operation region A2 by the shuttle operation.

Here, as the shuttle operation of (9D1) and (9D2), the control device 200 applies a voltage to the gate electrodes YQ1, YQ3, XJ4, and XQ5. The control device 200 lowers the potential of the gate electrode YQ1 and YQ3, raises the potential of the gate electrode XJ4, and raises the potential of the gate electrode XQ5.

Figure 9E:
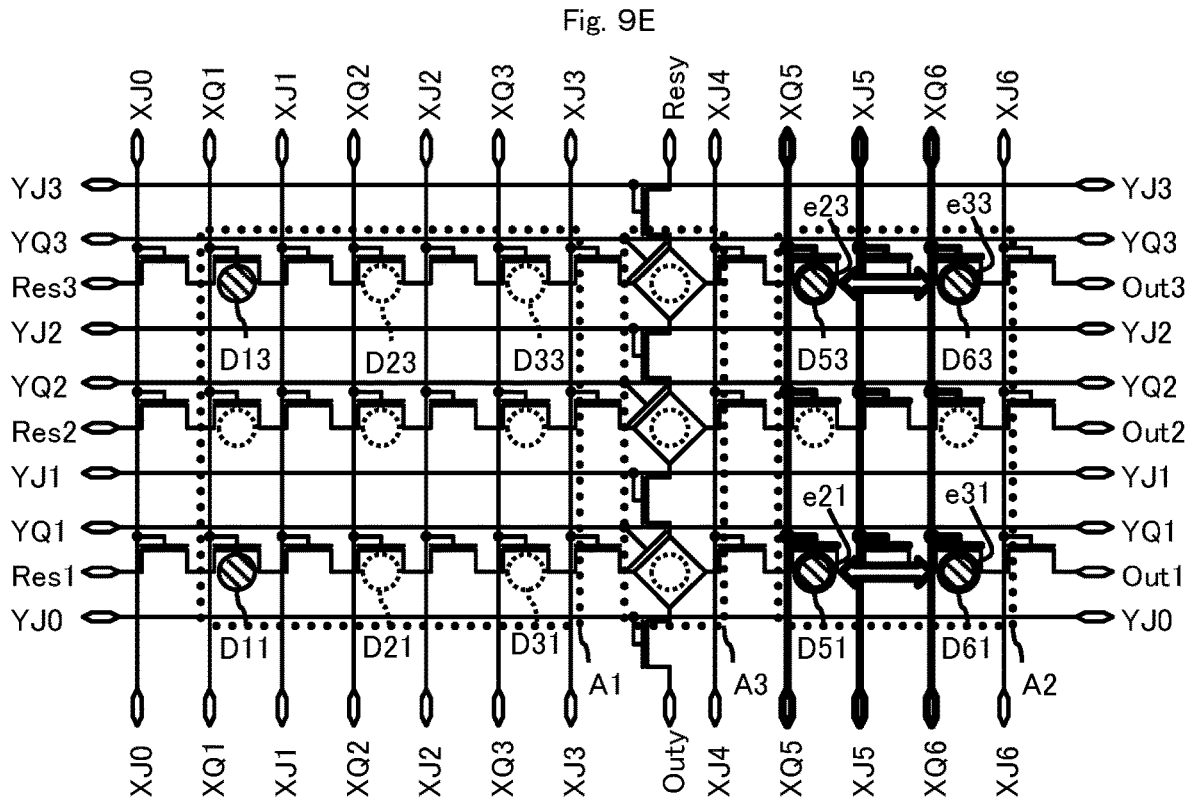
FIG. 9E is a circuit diagram of the quantum calculation device in the process of the processing of the third calculation example.

As described above, the electrons e21, e31, e23, and e33 confined in the quantum dots D21, D31, D23, and D33 in the storage region A1 are moved to the quantum dots D51, D61, D53, and D63 in the operation region A2 by the shuttle operation. As illustrated in FIG. 9E, the operation of the control NOT gate described by using FIG. 5 can be performed to the electrons e21, e31, e23, and e33 moved to the quantum dots D51, D61, D53, and D63.

Then, as described by using FIG. 5, the control device 200 performs the operation of the control NOT gate to the electrons e21 and e31 moved to the quantum dots D51 and D61. Simultaneously, as described by using FIG. 5, the control device 200 performs the operation of the control NOT gate to the electrons e23 and e33 moved to the quantum dots D53 and D63.

Finally, the control device 200 outputs the electrons e21 and e31 after the operation of the control NOT gate to the measurement device 300 from the terminal Out1 of the X portion 112x1 in the calculation region 112, and allows the measurement device 300 to measure the state of the electron (the quantum bit) relevant to the electrons e21 and e31, such as the number of electrons (quantum bits), and to output the measurement result to the control device 200.

In addition, the control device 200 outputs the electrons e23 and e33 after the operation of the control NOT gate to the measurement device 300 from the terminal Out3 of the X portion 112x3 in the calculation region 112, and allows the measurement device 300 to measure the state of the electron (the quantum bit) relevant to the electrons e23 and e33, such as the number of electrons (quantum bits), and to output the measurement result to the control device 200.

The state of the electron (the quantum bit) measured by the measurement device 300 is the calculation result of the quantum calculation.

Effects of Invention

As described above, the quantum information processing system 1 moves the electron (the quantum bit) stored in the storage region A1 from the storage region A1 to the operation region A2 by the shuttle operation, and further performs the quantum gate operation of changing the spin state to the quantum bit in the operation region A2.

Here, the operation performed by the quantum information processing system 1 to move the target electrons (the quantum bit) for quantum gate operation from the storage area A1 to the operation area A2 is a shuttle operation. The shuttle operation moves electrons (the quantum bit) by the Coulomb force generated using the gate electrodes XJ and XQ of the first gate electrode layer 120 and the gate electrodes YJ and YQ (the plurality of gate electrodes) of the second gate electrode layer 130. The shuttle operation is capable of moving the electron (the quantum bit) at a high speed and a high fidelity, compared to many other gate operations. Accordingly, the quantum information processing system 1 is capable of perform the quantum calculation using the electron (the quantum bit) at a higher speed.

Then, by using the shuttle operation, when the quantum information processing system 1 moves the target electron (the quantum bit) of the quantum gate operation from the storage region A1 to the operation region A2, the quantum information processing system 1 can suppress the disturbance of the electron spin (spin) states of both electrons (the quantum bit) targeted for quantum gate operation and electrons (the quantum bit) not targeted for the quantum gate operation.

Further, the quantum gate operation of changing the spin state to the quantum bit is performed in the operation region A2 outside the storage region A1. The electrons (the quantum bit) not targeted for the quantum gate operation are stored in the storage region A1. and exist away from the operation region A2 where the quantum gate operations are performed. Accordingly, the quantum information processing system 1 can suppress the disorder in the state of the electron spin (the spin) of the electron (the quantum bit), which is stored in the storage region A1 and is not the target of the quantum gate operation. Here the disorder in the state of the electron spin (the spin) of the electron is the disorder that caused by the quantum gate operation.

Accordingly, the quantum information processing system 1 is capable of suppressing the disorder in the electron spin (the spin) due to the movement operation to the electron (the quantum bit) and the quantum gate operation to the electron (the quantum bit). In other words, the quantum information processing system 1 is capable of performing the quantum calculation while suppressing the disorder in the state of the electron spin (the spin) of the electron (the quantum bit).

In addition, the quantum information processing system 1 suppresses the loss of the coherence of the quantum bit and enable the quantum bit to be operated at a higher speed, and thus, the quantum information processing system 1 is capable of more easily executing a large-scale calculation.

In addition, the quantum calculation device 100 (the quantum bit array 100A) includes the movement region A3 including the quantum dot used in the movement of the electron (the quantum bit) between the storage region A1 and the operation region A2. This ensures a sufficient distance between the moving area A3 and the storage area A1. Accordingly, the quantum information processing system 1 can more reliably suppress the disorder in the state of the electron spin (the spin) of the electron (the quantum bit), which is stored in the storage region A1 and is not the target of the quantum gate operation. Here the disorder in the state of the electron spin (the spin) of the electron is the disorder that caused by the quantum gate operation.

In addition, the quantum information processing system 1 moves the target electrons (qubits) for the quantum gate operation in the movement region A3. The movement region A3 is outside the storage region A1 in which the electron (the quantum bit) that is not the target of the quantum gate operation is stored. Thus, the quantum information processing system 1 can more reliably suppress the disorder in the state of the electron spin (the spin) of the electron (the quantum bit), which is stored in the storage region A1 and is not the target of the quantum gate operation. Here the disorder in the state of the electron spin (the spin) of the electron is the disorder that caused by the quantum gate operation.

In addition, since the movement region A3 includes the empty quantum dot not confining the electron (the quantum bit), the quantum information processing system 1 is capable of reliably moving the electron (the quantum bit) in the movement region A3.

In addition, the storage region A1 includes the empty quantum dot not confining the electron (the quantum bit). Accordingly, the quantum information processing system 1 can move the electron (the quantum bit) in an arbitrary position in the storage region A1 from the inside of the storage region A1 to the operation region A2 outside the storage region A1, and further apply the quantum gate operation of changing the spin state in the operation region A2.

Accordingly, the quantum information processing system 1 can a total binding quantum calculation. the total binding quantum calculation is a way of calculation that can apply the quantum gate operation to any two or more quantum bits out of all quantum bits.

In addition, the storage region A1 includes the empty quantum dot not confining the electron (the quantum bit) around the quantum dot confining the electron (the quantum bit). Accordingly, the quantum information processing system 1 easily moves the electron (the quantum bit) existing in the storage region A1 to an arbitrary the quantum dot in the storage region A1. Further, the quantum information processing system 1 easily moves the electron (the quantum bit) existing in the storage region A1 to the operation region A2 outside the storage region A1. Accordingly, the quantum information processing system 1 is capable of more reliably executing the quantum calculation. In addition, the quantum information processing system 1 is capable of executing the quantum calculation at a higher speed.

In addition, the quantum information processing system 1 can simultaneously move two or more quantum bits stored in the storage region A1, in the process of moving the electrons stored in the storage region A1 to the operation region A2 (refer to FIG. 7B, FIG. 7C, FIG. 8E, and FIG. 9A to FIG. 9E). Accordingly, the quantum information processing system 1 is capable of executing the quantum calculation at a higher speed.

First Modification Example

In the first to third calculation examples described above, the quantum calculation device 100 of the quantum information processing system 1 does not confine the electron (the quantum bit) in the quantum dot of the X portion 112x2 in the calculation region 112. In the calculation region 112 of a first modification example, the X portion 112x2 is omitted, and the X portion 112x1, the X portion 112x3, and the Y portion 112y1 form the calculation region.

Second Modification Example

In the first to third calculation examples described above, the quantum calculation device 100 of the quantum information processing system 1 does not confine the electron (the quantum bit) in the quantum dot of the X portion 112x2 in the calculation region 112, in the initial state. The quantum calculation device 100 of the quantum information processing system 1 of a second modification example confines the electron (the quantum bit) in the quantum dot of the X portion 112x2 calculation region 112, in the initial state.

Third Modification Example (FIG. 10)

The quantum information processing system 1 of the embodiment includes one storage region A1, one operation region A2, and one movement region A3 in the quantum bit array 100A. The size, the shape, and the arrangement of the storage region A1, the operation region A2, and the movement region A3 can be freely changed. FIG. 10 is a diagram illustrating an example of the arrangement of the storage region A1, the operation region A2, and the movement region A3 in the quantum bit array 100A of the quantum information processing system 1 of a third modification example. In the quantum bit array 100A of FIG. 10, the movement region A3 is provided around the storage region A1 and the operation region A2. Accordingly, the electron (the quantum bit) stored in the storage region A1 is easily moved to the operation region A2.

Fourth Modification Example (FIG. 11)

FIG. 11 is a diagram illustrating an example of the arrangement of the storage region A1, the operation region A2, and the movement region A3 in the quantum bit array 100A of the quantum information processing system 1 of a fourth modification example.

As illustrated in FIG. 11, in the quantum bit array 100A of the quantum information processing system 1 of the fourth modification example, the storage region A1 is surrounded by the movement region A3, and the corner portion of the storage region A1 is in contact with the operation region A2. Accordingly, since there are two storage regions A1 around the movement region A3 adjacent to the operation region A2, the electron (the quantum bit) stored in the storage region A1 is easily moved to the operation region A2.

Fifth Modification Example (FIG. 12)

FIG. 12 is a diagram illustrating an example of the arrangement of the storage region A1, the operation region A2, and the movement region A3 in the quantum bit array 100A of the quantum information processing system 1 of a fifth modification example.

As illustrated in FIG. 12, in the quantum bit array 100A of the quantum information processing system 1 of the fifth modification example, two movement regions A3 and one operation region A2 are interposed between two storage regions A1. Accordingly, the electron (the quantum bit) stored in the storage region A1 is easily moved to the operation region A2.

Sixth Modification Example (FIG. 13)

FIG. 13 is a diagram illustrating an example of the arrangement of the storage region A1 and the operation region A2 in the quantum bit array 100A of the quantum information processing system 1 of a sixth modification example.

As illustrated in FIG. 13, in the quantum bit array 100A of the quantum information processing system 1 of the sixth modification example, one operation region A2 is interposed between two storage regions A1. Here, the operation region A2 also functions as the movement region A3, and includes the quantum dot used for moving the electron (the quantum bit). Then, in the quantum bit array 100A of the sixth modification example, the movement region A3 is not provided. According to the configuration of the quantum bit array 100A of the sixth modification example, the electron (the quantum bit) stored in the storage region A1 is easily moved to the operation region A2.

Seventh Modification Example (FIG. 14)

FIG. 14 is a diagram illustrating an example of the arrangement of the storage region A1 and the operation region A2 in the quantum bit array 100A of the quantum information processing system 1 of a seventh modification example.

As illustrated in FIG. 14, in the quantum bit array 100A of the quantum information processing system 1 of the seventh modification example, one operation region A2 is provided in one storage region A1. Here, the operation region A2 also functions as the movement region A3, and the operation region A2 includes the quantum dot used for moving the electron (the quantum bit). Then, in the quantum bit array 100A of the seventh modification example, the movement region A3 is not provided.

According to the configuration of the quantum bit array 100A of the seventh modification example, the electron (the quantum bit) stored in the storage region A1 is easily moved to the operation region A2. In addition, since the storage region A1 exists around the operation region A2, the quantum gate operation of changing the spin state is easily performed to many electrons (quantum bits) in one operation region A2.

Note that, the invention is not limited to the embodiment and the modification examples described above, and various modifications are available within the scope of the gist thereof.

What is claimed is:

1. A quantum information processing system performing a quantum gate operation of changing a spin state to a plurality of quantum bits, the system comprising:

a quantum bit array including a plurality of quantum dots capable of confining the quantum bit and a plurality of gate electrodes used in control of the plurality of quantum dots; and a control device controlling the plurality of quantum bits confined in the quantum bit array by using the plurality of gate electrodes, wherein the quantum bit array includes:

a storage region including a plurality of quantum dots storing the quantum bit; and an operation region including a plurality of quantum dots capable of applying the quantum gate operation of changing the spin state to the confined quantum bit, and the control device moves the quantum bit stored in the storage region from the storage region to the operation region by a shuttle operation of moving the quantum bit with a Coulomb force generated by using the plurality of gate electrodes, and further performs the quantum gate operation of changing the spin state to the quantum bit in the operation region.

2. The quantum information processing system according to claim 1, wherein the quantum bit array further includes a movement region that is including a quantum dot used in a movement of the quantum bit and that is between the storage region and the operation region.

3. The quantum information processing system according to claim 2, wherein the movement region includes an empty quantum dot not confining the quantum bit.

4. The quantum information processing system according to claim 2, further comprising:

a magnet provided around the operation region; and a magnetic shield shielding the storage region and the movement region from the magnetic force of the magnet.

5. The quantum information processing system according to claim 1, wherein the storage region includes an empty quantum dot not confining the quantum bit.

6. The quantum information processing system according to claim 5, wherein the storage region includes the empty quantum dot around the quantum dot confining the quantum bit.

7. A quantum information processing method of a quantum information processing system performing a quantum gate operation of changing a spin state to a plurality of quantum bits, wherein the quantum information processing system includes:

a quantum bit array including a plurality of quantum dots capable of containing the quantum bit and a plurality of gate electrodes used in control of the plurality of quantum dots; and a control device controlling the plurality of quantum bits confined in the quantum bit array by using the plurality of gate electrodes, the quantum bit array includes:

a storage region including a plurality of quantum dots storing the quantum bit; and an operation region including a plurality of quantum dots capable of applying the quantum gate operation of changing the spin state to the confined quantum bit, and the method allows the control device moves the quantum bit stored in the storage region from the storage region to the operation region by a shuttle operation of moving the quantum bit with a Coulomb force generated by using the plurality of gate electrodes, and further performs the quantum gate operation of changing the spin state to the quantum bit in the operation region.

8. A quantum information processing method of the quantum information processing system according to claim 7, wherein the method allows the control device to perform an operation of simultaneously moving two or more quantum bits stored in the storage region, in a process of moving the quantum bit stored in the storage region from the storage region to the operation region.

* * * * *